US007785188B2

(12) United States Patent
Cannon

(10) Patent No.: US 7,785,188 B2
(45) Date of Patent: Aug. 31, 2010

(54) GAMING DEVICE INCLUDING A PLURALITY OF SELECTABLE POSITIONS AND AN OUTCOME MODIFIER

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 679 days.

(21) Appl. No.: 11/115,852

(22) Filed: Apr. 27, 2005

(65) Prior Publication Data

US 2006/0246977 A1 Nov. 2, 2006

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................... 463/20; 463/25

(58) Field of Classification Search .................... 463/20
See application file for complete search history.

(56) References Cited

U.S. PATENT DOCUMENTS

| | | | |
|---|---|---|---|
| 1,527,929 | A | 2/1925 | Simons |
| 2,545,644 | A | 3/1951 | Benton et al. |
| 3,819,186 | A | 6/1974 | Hinterstocker |
| 4,258,838 | A | 3/1981 | Rockola et al. |
| 4,410,178 | A | 10/1983 | Partridge |
| 4,560,161 | A | 12/1985 | Hamano |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,756,531 | A | 7/1988 | DiRe et al. |
| 4,805,907 | A | 2/1989 | Haiwara |
| 4,836,553 | A | 6/1989 | Suttle et al. |
| 4,861,041 | A | 8/1989 | Jones et al. |

(Continued)

FOREIGN PATENT DOCUMENTS

| | | |
|---|---|---|
| AU | 199716432 B2 | 9/1997 |

(Continued)

OTHER PUBLICATIONS

A Salute to Game Shows—The Price is Right-Pricing Games from http://schuminweb.com/game-shows/shows/price-is-right/pricing-games.htm, printed on Mar. 16, 2001.

(Continued)

*Primary Examiner*—John M Hotaling
*Assistant Examiner*—Kevin Y Kim
(74) *Attorney, Agent, or Firm*—K&L Gates LLP

(57) ABSTRACT

A gaming device including a plurality of positions displayed to the player. The gaming device includes a modifier and a symbol display which displays at least one symbol at one or more of the positions. Each symbol includes at least one game element. In a play of the game, the gaming device determines at least one of the game elements to be a designated element and enables the player to pick one of the positions. The gaming device displays at least one of the symbols at one or more of the positions and determines an outcome based on any winning combination of the symbols displayed at the positions. The processor modifies any determined outcome by the modifier when the designated element is displayed at the selected position. The modified outcome is provided to the player in that play of the game.

33 Claims, 22 Drawing Sheets

U.S. PATENT DOCUMENTS

| | | | |
|---|---|---|---|
| 4,871,171 | A | 10/1989 | Rivero |
| 4,991,848 | A | 2/1991 | Greenwood et al. |
| 5,019,973 | A | 5/1991 | Wilcox et al. |
| 5,033,744 | A | 7/1991 | Bridgeman et al. |
| 5,092,598 | A | 3/1992 | Kamille |
| 5,098,107 | A | 3/1992 | Boylan et al. |
| 5,167,413 | A | 12/1992 | Fulton |
| 5,178,390 | A | 1/1993 | Okada |
| 5,205,555 | A | 4/1993 | Hamano |
| 5,249,800 | A | 10/1993 | Hilgendorf et al. |
| 5,259,616 | A | 11/1993 | Bergmann |
| 5,288,077 | A | 2/1994 | Jones |
| 5,288,081 | A | 2/1994 | Breeding |
| 5,332,219 | A | 7/1994 | Marnell, II et al. |
| 5,342,047 | A | 8/1994 | Heidel et al. |
| 5,342,049 | A | 8/1994 | Wichinksy et al. |
| 5,362,052 | A | 11/1994 | Kubatsch |
| 5,364,105 | A | 11/1994 | Jones |
| 5,377,973 | A | 1/1995 | Jones et al. |
| 5,393,057 | A | 2/1995 | Marnell, II |
| 5,393,061 | A | 2/1995 | Manship et al. |
| 5,407,200 | A | 4/1995 | Zalabak |
| 5,431,407 | A | 7/1995 | Hofberg et al. |
| 5,437,462 | A | 8/1995 | Breeding |
| 5,452,899 | A | 9/1995 | Skratulia et al. |
| 5,456,465 | A | 10/1995 | Durham |
| 5,490,670 | A | 2/1996 | Hobert |
| 5,494,287 | A | 2/1996 | Manz |
| 5,511,781 | A * | 4/1996 | Wood et al. .................. 463/13 |
| 5,524,888 | A | 6/1996 | Heidel |
| 5,529,309 | A | 6/1996 | Bartlett |
| 5,531,440 | A | 7/1996 | Dabrowski et al. |
| 5,531,441 | A | 7/1996 | Dabrowski et al. |
| 5,536,016 | A | 7/1996 | Thompson |
| 5,540,442 | A | 7/1996 | Orselli et al. |
| 5,542,669 | A | 8/1996 | Charron et al. |
| 5,560,603 | A | 10/1996 | Seelig et al. |
| 5,577,731 | A | 11/1996 | Jones |
| 5,584,485 | A | 12/1996 | Jones et al. |
| 5,607,162 | A | 3/1997 | Boylan et al. |
| 5,611,535 | A | 3/1997 | Tiberio |
| 5,626,341 | A | 5/1997 | Jones et al. |
| 5,636,838 | A | 6/1997 | Caro |
| 5,647,798 | A | 7/1997 | Falciglia |
| 5,660,391 | A | 8/1997 | Klasee |
| 5,660,393 | A | 8/1997 | Dreger |
| 5,664,781 | A | 9/1997 | Feola |
| 5,711,525 | A | 1/1998 | Breeding |
| 5,732,948 | A | 3/1998 | Yoseloff |
| 5,743,524 | A | 4/1998 | Nannicola |
| 5,755,440 | A | 5/1998 | Sher |
| 5,766,074 | A | 6/1998 | Cannon et al. |
| 5,769,716 | A | 6/1998 | Saffari et al. |
| 5,772,509 | A | 6/1998 | Weiss |
| 5,775,692 | A | 7/1998 | Watts et al. |
| 5,794,964 | A | 8/1998 | Jones et al. |
| 5,795,225 | A | 8/1998 | Jones et al. |
| 5,823,873 | A | 10/1998 | Moody |
| 5,833,536 | A | 11/1998 | Davids et al. |
| 5,848,932 | A | 12/1998 | Adams |
| 5,851,148 | A | 12/1998 | Brune et al. |
| 5,855,514 | A | 1/1999 | Kamille |
| 5,873,781 | A | 2/1999 | Keane |
| 5,882,261 | A | 3/1999 | Adams |
| 5,885,157 | A | 3/1999 | Harada et al. |
| 5,890,962 | A | 4/1999 | Takemoto |
| 5,911,418 | A | 6/1999 | Adams |
| 5,919,088 | A | 7/1999 | Weiss |
| 5,927,714 | A | 7/1999 | Kaplan |
| 5,935,002 | A | 8/1999 | Falciglia |
| 5,951,397 | A | 9/1999 | Dickinson |
| 5,964,463 | A | 10/1999 | Moore, Jr. |
| 5,967,894 | A | 10/1999 | Kinoshita et al. |
| 5,980,384 | A | 11/1999 | Barrie |
| 5,984,781 | A | 11/1999 | Sunaga |
| 5,996,997 | A | 12/1999 | Kamille |
| 5,997,400 | A | 12/1999 | Seelig et al. |
| 5,997,401 | A | 12/1999 | Crawford |
| 6,004,207 | A | 12/1999 | Wilson, Jr. et al. |
| 6,015,346 | A | 1/2000 | Bennett |
| 6,019,369 | A | 2/2000 | Nakagawa et al. |
| 6,033,307 | A | 3/2000 | Vancura |
| 6,059,289 | A | 5/2000 | Vancura |
| 6,062,980 | A | 5/2000 | Luciano |
| 6,089,976 | A | 7/2000 | Schneider et al. |
| 6,093,102 | A | 7/2000 | Bennett |
| 6,102,798 | A | 8/2000 | Bennett |
| 6,117,009 | A | 9/2000 | Yaseloff |
| 6,120,031 | A | 9/2000 | Adams |
| 6,120,377 | A | 9/2000 | McGinnis, Sr. et al. |
| 6,120,378 | A | 9/2000 | Moody et al. |
| 6,126,541 | A | 10/2000 | Fuchs |
| 6,126,542 | A | 10/2000 | Fier |
| 6,135,885 | A | 10/2000 | Lermusiaux |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,521 | A | 11/2000 | Sanduski |
| 6,155,925 | A | 12/2000 | Giobbi et al. |
| 6,159,095 | A | 12/2000 | Frohm et al. |
| 6,159,096 | A | 12/2000 | Yoseloff |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,190,254 | B1 | 2/2001 | Bennett |
| 6,209,869 | B1 | 4/2001 | Matthews |
| 6,210,279 | B1 | 4/2001 | Dickinson |
| 6,213,876 | B1 | 4/2001 | Moore, Jr. |
| 6,217,022 | B1 | 4/2001 | Astaneha |
| 6,224,483 | B1 | 5/2001 | Mayeroff |
| 6,227,542 | B1 | 5/2001 | Cosmi |
| 6,231,442 | B1 | 5/2001 | Mayeroff |
| 6,231,445 | B1 | 5/2001 | Acres |
| 6,238,288 | B1 | 5/2001 | Walker et al. |
| 6,254,481 | B1 | 7/2001 | Jaffe |
| 6,261,177 | B1 | 7/2001 | Bennett |
| 6,270,409 | B1 | 8/2001 | Shuster |
| 6,270,412 | B1 | 8/2001 | Crawford et al. |
| 6,290,600 | B1 | 9/2001 | Glasson |
| 6,296,568 | B1 | 10/2001 | Tracy |
| 6,302,790 | B1 | 10/2001 | Brossard |
| 6,305,686 | B1 | 10/2001 | Perrie et al. |
| 6,309,300 | B1 | 10/2001 | Glavich |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,336,860 | B1 | 1/2002 | Webb |
| 6,340,158 | B2 | 1/2002 | Pierce et al. |
| 6,346,043 | B1 | 2/2002 | Colin et al. |
| 6,347,996 | B1 | 2/2002 | Gilmore et al. |
| 6,375,187 | B1 | 4/2002 | Baerlocher |
| 6,398,218 | B1 | 6/2002 | Vancura |
| 6,398,220 | B1 | 6/2002 | Inoue |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,416,408 | B2 | 7/2002 | Tracy et al. |
| 6,419,579 | B1 | 7/2002 | Bennett |
| 6,435,511 | B1 | 8/2002 | Vancura et al. |
| 6,439,995 | B1 | 8/2002 | Hughs-Baird et al. |
| 6,454,266 | B1 | 9/2002 | Breeding et al. |

| | | | | |
|---|---|---|---|---|
| 6,454,651 | B1 | 9/2002 | Yoseloff | |
| 6,461,241 | B1 | 10/2002 | Webb et al. | |
| 6,471,208 | B2 | 10/2002 | Yoseloff et al. | |
| 6,481,713 | B2 | 11/2002 | Perrie et al. | |
| 6,491,584 | B2 | 12/2002 | Graham et al. | |
| 6,494,785 | B1 | 12/2002 | Gerrard et al. | |
| 6,506,118 | B1 | 1/2003 | Baerlocher et al. | |
| 6,514,141 | B1 | 2/2003 | Kaminkow et al. | |
| 6,561,904 | B2 | 5/2003 | Locke et al. | |
| 6,569,015 | B1 | 5/2003 | Baerlocher et al. | |
| 6,575,830 | B2 | 6/2003 | Baerlocher et al. | |
| 6,585,591 | B1 | 7/2003 | Baerlocher et al. | |
| 6,595,854 | B2 | 7/2003 | Hughs-Baird et al. | |
| 6,599,185 | B1 | 7/2003 | Kaminkow et al. | |
| 6,599,192 | B1 | 7/2003 | Baerlocher et al. | |
| 6,602,137 | B2 | 8/2003 | Kaminkow et al. | |
| 6,607,437 | B2 | 8/2003 | Casey et al. | |
| 6,609,974 | B2 | 8/2003 | Mead et al. | |
| 6,632,141 | B2 | 10/2003 | Webb et al. | |
| 6,638,164 | B2 | 10/2003 | Randall et al. | |
| 6,659,867 | B1 | 12/2003 | Kodachi et al. | |
| 6,699,122 | B1 | 3/2004 | Osawa | |
| 6,719,630 | B1 | 4/2004 | Seelig et al. | |
| 6,877,745 | B1 | 4/2005 | Walker et al. | |
| 6,899,620 | B2 | 5/2005 | Kaminkow et al. | |
| 7,192,347 | B1 | 3/2007 | Marks et al. | |
| 7,275,989 | B2 | 10/2007 | Moody | |
| 2001/0005690 | A1 | 6/2001 | Boulton | |
| 2002/0025844 | A1 | 2/2002 | Casey et al. | |
| 2002/0045475 | A1 | 4/2002 | Glavich et al. | |
| 2002/0072402 | A1 | 6/2002 | Baerlocher | |
| 2002/0142822 | A1 | 10/2002 | Baerlocher et al. | |
| 2002/0151350 | A1 | 10/2002 | Baerlocher et al. | |
| 2002/0155883 | A1 | 10/2002 | Baerlocher | |
| 2002/0169017 | A1 | 11/2002 | Visoenik | |
| 2002/0183109 | A1 | 12/2002 | McGahn et al. | |
| 2003/0013514 | A1 | 1/2003 | Cregan et al. | |
| 2003/0036422 | A1* | 2/2003 | Baerlocher et al. | 463/20 |
| 2003/0040355 | A1 | 2/2003 | Baerlocher | |
| 2003/0045344 | A1 | 3/2003 | Webb et al. | |
| 2003/0045348 | A1 | 3/2003 | Palmer et al. | |
| 2003/0050110 | A1 | 3/2003 | Wichinsky | |
| 2003/0064795 | A1 | 4/2003 | Baerlocher et al. | |
| 2003/0078093 | A1 | 4/2003 | Simms et al. | |
| 2003/0078096 | A1 | 4/2003 | Kaminkow et al. | |
| 2003/0162578 | A1 | 8/2003 | Baerlocher et al. | |
| 2003/0162584 | A1 | 8/2003 | Hughs-Baird et al. | |
| 2003/0162585 | A1* | 8/2003 | Bigelow et al. | 463/20 |
| 2003/0216163 | A1 | 11/2003 | Kaminkow et al. | |
| 2004/0033827 | A1* | 2/2004 | Gilmore et al. | 463/20 |
| 2004/0259625 | A1 | 12/2004 | Randall | |
| 2005/0192081 | A1 | 9/2005 | Marks et al. | |
| 2006/0030387 | A1 | 2/2006 | Jackson | |
| 2006/0068883 | A1 | 3/2006 | Randall et al. | |

FOREIGN PATENT DOCUMENTS

| | | | |
|---|---|---|---|
| AU | A-50327/96 | | 10/1997 |
| AU | A-63553/98 | | 10/1998 |
| DE | 3700861 | A1 | 7/1988 |
| DE | 4014477 | A1 | 7/1991 |
| EP | 0 688 002 | B1 | 12/1995 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 984 409 | A2 | 3/2000 |
| EP | 1 184 822 | | 3/2002 |
| GB | 2 083 936 | A | 3/1982 |
| GB | 2 090 690 | A | 7/1982 |
| GB | 2 092 797 | | 8/1982 |
| GB | 2 0 96 376 | A | 10/1982 |
| GB | 2 097 160 | A | 10/1982 |
| GB | 2 100 905 | A | 1/1983 |
| GB | 2 105 891 | A | 3/1983 |
| GB | 2 117 155 | A | 10/1983 |
| GB | 2 137 392 | A | 10/1984 |
| GB | 2 144 644 | A | 3/1985 |
| GB | 2 161 008 | A | 1/1986 |
| GB | 2 170 636 | A | 8/1986 |
| GB | 2 181 589 | A | 4/1987 |
| GB | 2 183 882 | A | 6/1987 |
| GB | 2 191 030 | A | 12/1987 |
| GB | 2 222 712 | A | 3/1990 |
| GB | 2 225 889 | A | 6/1990 |
| GB | 2 226 436 | A | 6/1990 |
| GB | 2 242 300 | A | 9/1991 |
| GB | 2 262 642 | A | 6/1993 |
| GB | 2 328 311 | A | 2/1999 |
| WO | WO 97/32285 | | 9/1997 |
| WO | WO 0012186 | | 3/2000 |

OTHER PUBLICATIONS

Addams Family Advertisement and Article, written by IGT & Strictly Slots, published in Jul. 2000.
American Thunder Screen Shots, written by IGT, published in 1998, on or before December thereof.
American Thunder Screen Shots, written by IGT, published in 2001.
Austin Powers Advertisement, written by IGT, published in 2001.
Bally Slot Machines Electro-Mechanicals 1964-1980 (on or before December thereof) Book [In Part], Revised 3rd Edition written by Marshall Fey.
Battleship Advertisement, written by Mikohn, published in 2003.
Battleship Article, written by Strictly Slots, published in 2000.
Big Bang Piggy Bankin Advertisement, written by WMS Gaming, Inc., published prior to 2000, on or before December thereof.
Bonus Roulette Brochure, written by R. Franco, published prior to Apr. 2005.
Bonus Times Article, written by Bally Gaming, published in 2000, on or before December thereof.
Buck's Roulette Brochure, written by R. Franco, published prior to Apr. 2005.
Bunco Night Advertisement, written by IGT, published in 2002, on or before December thereof.
By George Advertisement, written by IGT, published in 2002, on or before December thereof.
Cash Box Advertisement & Article, written by Anchor Games & Strictly Slots, published in 2000, on or before December thereof.
Cash Crop Brochure, written by Aristocrat Leisure Industries, published in 1997, on or before December thereof.
Chutes & Ladders Game Instructions, written by Hasbro-Milton Bradley, published in 1999, on or before December thereof.
Cuckoo Brochure, written by Aristocrat, published in Feb. 1998, on or before December thereof.
Double Diamond Game Description, written by IGT, printed on Mar. 21, 2001.
Double Up Poker Game Description, written by IGT, published prior to Apr. 2005.
Field Testing New Slots Article, written by Strictly Slots, published in Jul. 2000.
Fire and Fortune Article, written by Strictly Slots, published in May 2001.
Fox "N" Hound Advertisement, written by IGT, published in 2000, on or before December thereof.
Good Times Brochure, written by IGT, published in 1999, on or before December thereof.
I Love Lucy Advertisement, written by IGT, published in 2002, on or before December thereof.
In Between Game Description, written by IGT, available prior to 2000, on or before December thereof.
Jackpot Party Brochures and Articles, written by WMS.Gaming, Inc., published in 1998, on or before December thereof.
Leopard Spots™ (website) Description, printed from www.igt.com on Mar. 21, 2001.

Live Random Dice Machines Article, written by General Automatic Amusement, published prior to Apr. 2005.
Mega Multiplier® Description, (website), printed from www.wmsgaming.com, on May 22, 2001.
Mikohn Solutions Article, published by the World Gaming Congress 2000 Edition, on or before December thereof.
Mistress of the Dark™ Advertisement, written by IGT, published in 2002.
Money Grab (website) Description, printed from www.wmsgaming.com on May 22, 2001.
Money Grab Article, written by Strictly Slots, published in Apr. 2001.
Money Mouse Brochure, written by Aristocrat Leisure Industries, published in 1997, on or before December thereof.
Monopoly Brochures and Articles, written by WMS Gaming, Inc. published 1998, on or before December thereof.
Monopoly Party Train Article, written by Strictly Slots, published Feb. 2002.
Monte Carlo Advertisement, written by Bally Gaming, Inc., published in 2002.
Neon Nights Advertisement, written by IGT, published in 2000, on or before December thereof.
New Kids Article, written by Strictly Slots, published in Dec. 2000.
Odds On Gaming™, Inc. Brochure, written by Odds on Gaming, published prior to Apr. 2005.
On the Money Article, written by Strictly Slots, published in Dec. 2000.
Polly & Roger Brochure, written by VLC, Inc, published in 2000, on or before December thereof.
Q*bert board game instructions, written by Parker Brothers, published in 1983, on or before December thereof.
Q*bert: Classic Video Game Surrealism from the Golden Age of Arcade Games Article, written by e-glide and printed from http://users.rcn.com/e-glide/qbert2.html on Mar. 12, 2002.
Q*bert game description, written by The Killer List of Videogames, printed from http://www.klov.com/Q/Q*bert.html on Mar. 12, 2002.
Q*bert's Qubes game description, written by The Killer List of Videogames, printed from http://www.klov.com/Q/Q*bert's_Qubes.html on Mar. 12, 2002.
Q-Bert video game advertisement for PlayStation, printed from http://www.amazon.com on Mar. 12, 2002.
Q*Bert video game advertisement, written by Pennsylvania Gameroom Warehouse, printed from http://www.gameroomwarehouse.com/videogame/qbert.html on Mar. 12, 2002.
Q*bert video game cartridge instructions for ATARI 2600 game system, written by Parker Brothers, printed from http://www.hasbro.com/default.asp?x=cc_gameandtoyinstructions on Mar. 12, 2002.
Q*bert video game cartridge instructions for ATARI home computer, written by Parker Brothers and Arcade/Action Software, printed from http://www.hasbro.com/default.asp?x=cc_gameandtoyinstructions on Mar. 12, 2002.
Q*bert video game cartridge instructions for Colecovision game system, written by Parker Brothers, printed from http://www.hasbro.com/default.asp?x=cc_gameandtoyinstructions on Mar. 12, 2002.
Q*bert video game cartridge instructions for Commodore 64 game system, written by Parker Brothers and Arcade/Action Software, printed from http://www.hasbro.com/default.asp?x=cc_gameandtoyinstructions on Mar. 12, 2002.
Q*bert video game cartridge instructions for Intellivision game system, written by Parker Brothers, printed from http://www.hasbro.com/default.asp?x=cc_gameandtoyinstructions on Mar. 12, 2002.
Q*bert video game cartridge instructions for Texas Instruments 99/4A game system, written by Parker Brothers and Arcade/Action Software, printed from http://www.hasbro.com/default.asp?x=cc_gameandtoyinstructions on Mar. 12, 2002.
R&B™ Brochure, published by AC Coin & Slot, published prior to Apr. 2005.
Rapid Roulette™ Advertisement, written by John Huxley Ltd., published in 2002.
Richard Petty Advertisement, written by IGT, published in 2000, on or before December thereof.
Roll & Win Advertisement, written by WMS Gaming, wmsgaming.com, printed Jun. 8, 2001.
Roulette Grand Jeu brochure, written by Amatic Industries, published prior to Apr. 2005.
Roulette Advertisement, written by Atronic Casino Technology, published in 1999.
Royal Roulette advertisement, written by Barcrest Games, published prior to Apr. 2005.
Royal Roulette Brochure, written by Impulse Gaming Ltd., published prior to Apr. 2005.
Slot Machines A Pictorial History of the First 100 Years, 5th edition [In Part], written by Marshall Fey, published 1983 to 1997, on or before December thereof.
Slot Machine Buyer's Handbook, A Consumer's Guide to Slot Machines [In Part] written by David L. Saul and Daniel R. Mead, published 1998, on or before December thereof.
Slot Machines on Parade, 1st edition written by Robert N. Geddes and illustrated by Daniel R. Mead, published in 1980.
Slot Machines On Parade [In Part] written by Robert N. Geddes and illustrated by Daniel R. Mead, published 1980, on or before December thereof.
South Park—Dodgeball Advertisement, written by IGT, published in 2000, on or before December thereof.
Spam Article written by IGT, published in 2002, on or before December thereof.
Spell Binder Advertisement, written by IGT, published in 2000, on or before December thereof.
Stars, Bars and Bones Game Description, written by P&M Coins, Inc. available 1997, on or before December thereof.
Take Your Pick Advertisement, written by IGT/Anchor Gaming, published in 1999, on or before December thereof.
Take Your Pick Article, written by Strictly Slots, published Mar. 2001.
Texas Tea Advertisement, written by IGT, published in 2000, on or before December thereof.
The Creation of Q*Bert, written by Warren Davis, printed from http://www.coinop.org/features/qbstory.html on Mar. 12, 2002.
The History of Q*Bert, written by Jeff Lee, published in 1998 and printed from http://users.aol.com/JPMLee/qbert.htm on Mar. 12, 2002.
Top Dollar Brochure, written by IGT, published in 1998, on or before December thereof.
Vision Series™/Good Times™ Brochure, written by IGT, published in 1999, on or before December thereof.
Wheel Poker Article, written by Strictly Slots (Anchor Games), published in Nov. 2000.
Who Dunnit Advertisement, written by WMS Gaming, Inc., published Jun. 26, 2001.
Winning Streak Web Site Description, written by WMS Gaming Inc. (web site), printed on Mar. 21, 2001.
X Factor Brochure and Website Page, written by WMS Gaming, Inc., published in 1998, on or before December thereof.
3-Way Action Poker Brochure and Article written by written by IGT, published in 2002, on or before December thereof.

* cited by examiner

FIG. 4B

| WINNING CARD COMBINATIONS | AWARD |
|---|---|
| ROYAL FLUSH | 2500 |
| STRAIGHT FLUSH | 1000 |
| FOUR OF A KIND | 500 |
| FULL HOUSE | 250 |
| FLUSH | 150 |
| STRAIGHT | 100 |
| THREE OF A KIND | 50 |
| TWO PAIR | 25 |
| ONE PAIR (JACKS OR BETTER) | 10 |

GAMING DEVICE INCLUDING A PLURALITY OF SELECTABLE POSITIONS AND AN OUTCOME MODIFIER

BACKGROUND

Contemporary gaming devices such as slot machines often include a primary game and one or more bonus rounds or bonus games. The primary games typically include the generation of one or more symbols using one or more symbol generators. The traditional symbol generators are a set of reels, where each reel has a plurality of symbols. If the player achieves a predetermined combination of symbols on the reels, the player wins a value. In addition, if the player achieves a bonus triggering event, the gaming device advances the player to a bonus game where the player can accumulate additional values. The traditional bonus triggering event occurs when the player achieves a predetermined symbol on one of the reels or a predetermined combination of symbols on a plurality of reels. If the combination of symbols indicated on the reels is not a predetermined symbol or symbol combination, the gaming device does not provide an award to the player.

Conventional gaming devices employ different components to enhance a player's outcome in a game. One such component is a modifier. A modifier such as a multiplier enables players to obtain larger outcomes such as larger awards in a game. A multiplier increases the award amount proportionally to the value of the multiplier. For example, a "2×" multiplier pays twice the normal award value. A "3×" multiplier pays three times the normal award value. Therefore, a multiplier can substantially enhance a player's award.

Additionally, certain conventional gaming devices display selections and enable players to pick one or more of the selections to determine an outcome such as an award in a game. The selections therefore provide players with the opportunity to determine at least a portion of any outcome or award provided to the player in the game.

Players are attracted to gaming devices which provide new game schemes and interactive features including different ways of enhancing awards associated with winning symbol combinations or different types of triggering events. Therefore, to increase player enjoyment and excitement, it is desirable to provide players with new game schemes and features for gaming devices which include new and different ways of enhancing the awards provided to the players in a game.

SUMMARY

The present invention relates in general to a gaming device, and more particularly, to a gaming device having an award enhancement feature or bonus trigger.

In one embodiment, the gaming device includes a symbol display such as one or more reels or one or more wheels having a plurality of symbols, where each symbol includes at least one game element. The symbol display is operable to cause a plurality of the symbols to be displayed at a plurality of positions associated with the symbol display. The gaming device enables the player to select or pick one or more of the positions in a play of the game. The gaming device also determines or selects one or more of the symbols and/or game elements to be a designated element in the play of the game. The gaming device causes the symbol display to display at least one symbol at one, a plurality or each of the positions.

The gaming device evaluates the symbols displayed at the positions in a conventional manner to determine if any winning combinations of the symbols are displayed at the positions. The gaming device determines any awards associated with winning symbol combinations displayed at the positions. Additionally, if the symbol displayed at one of the selected positions for that play of the game is the designated element or includes a game element determined to be the designated element, the gaming device employs an award enhancement feature or bonus trigger. For instance, if the designated element is a seven and the symbol is a red seven, then this condition is satisfied. In one embodiment, the gaming device employs an award enhancement feature where the award enhancement feature is a modifier displayed to the player. The modifier may be any suitable modifier such as a multiplier and may be randomly determined, predetermined, determined based on a wager made by the player, or based on any other suitable determination method. It should be appreciated that the modifier may be a multiplier, additional credits or any other suitable modifier. The modifier modifies any award(s) determined based on the symbol combinations if the processor selected designated element is displayed at the player selected position. The gaming device provides any modified award or awards to the player. If the processor selected designated element(s) are not displayed at the player selected position(s), the gaming device provides the player any award or awards associated with winning combinations of the symbols displayed at the positions without modification.

Accordingly, the present invention increases player excitement and enjoyment in a game because players have the opportunity to obtain a relatively large award in each play of the game based on the award enhancement feature.

In another embodiment, the gaming device displays a plurality of positions to a player and enables the player to pick a plurality of the positions in each play of the game. In this embodiment, the award enhancement feature is based on the number of processor selected designated elements displayed at the player selected positions in the play of the game. In one such embodiment, the award enhancement feature is a modifier such as a multiplier and the gaming device increments the multiplier by a designated amount, such as one, for each designated element displayed at a selected position. For example, if the player picks two positions and the designated element is displayed at each of the two selected positions, the gaming device increments the multiplier by two, such as from 1× to 3×. It should be appreciated that the modifier may be incremented by a random amount, a predetermined amount, an amount based on a wager made by the player or any suitable amount or amounts. It should also be appreciated that the modifier may be incremented by any suitable value such as a positive value or a negative value.

In another embodiment, the gaming device displays a plurality of positions and enables a player to pick at least one of the positions and at least one designated element for the game. If the designated element is displayed at the position or positions selected by the player for that play of the game, the gaming device employs an award enhancement feature or bonus trigger. It should be appreciated that the gaming device may enable the player to pick one or a plurality of designated elements in one or a plurality of plays of the game.

In a further embodiment, the award enhancement feature is employed in a game where the symbols each include at least one designated value. In this embodiment, the gaming device enables a player to pick at least one of the positions and determines one of the symbols or the game elements to be the designated element in the play of the game. The gaming device causes the symbol display to display at least one of the symbols at each of the positions. The gaming device evaluates the symbols displayed at the positions to determine if any winning combinations of the symbols are displayed at the positions. The gaming device also determines the award enhancement feature based on the value associated with the symbol displayed at the player selected position if the symbol is the designated element or if the symbol includes a game element determined to be the designated element. In one embodiment, the value of the award enhancement feature such as a modifier is the value of the symbol displayed at the selected position when the symbol is the designated element or includes the designated element. The gaming device modifies any determined awards by the modifier and provides the modified award or awards to the player.

In one embodiment, the award enhancement feature is employed in a poker game having a plurality of conventional playing cards, where each of the playing cards includes game elements such as a value, a color and a suit (i.e., diamonds, hearts, spades and clubs). In this embodiment, the gaming device determines one of the suits to be the designated element in a play of the game. The gaming device causes the symbol display to display at least one of the playing cards at one or more of the positions. The gaming device evaluates the playing card(s) displayed at the positions to determine if any winning combinations of playing cards are displayed at the positions. The gaming device sums or multiplies the values associated with each playing card displayed at a player selected position if the playing cards displayed at the player selected positions include the designated suit. For example, if the designated element is the playing card suit of hearts and the three of hearts playing card and the four of hearts playing card are displayed at the selected positions, the gaming device sums the values of these playing cards and provides a multiplier of 7× (i.e., 3×+4×) to the player. It should be appreciated that the gaming device may sum, multiply or otherwise modify the values associated with the designated elements displayed at the selected positions.

In another embodiment, the gaming device displays a plurality of positions and an award enhancement feature such as a modifier which is based on or determined by only the value associated with the symbol displayed at the selected position if the symbol includes the designated element. In this embodiment, the gaming device displays a plurality of positions and enables a player to pick one of the positions in a play of the game. The gaming device generates and displays symbols, each including values, at each of the positions. If the symbol displayed at the player selected position includes the designated element, the gaming device determines the value of the modifier to be the value of the symbol displayed by the player selected position in that play of the game. For example as described above, if the designated element is a designated playing card suit such as hearts, and the ten of hearts is displayed by the selected position in a play of the game, the gaming device determines the value of the modifier to be 10× (i.e., the value of the modifier being equal to the value of the playing card) to the player. It should be appreciated that any suitable modifier may be provided to the player in each play of the game.

In another embodiment, the modifier includes at least one symbol. For example, the gaming device displays symbol display such as a plurality of reels and a plurality of positions to a player. The gaming device enables the player to select at least one of the positions and provides the modifier (i.e., a symbol on a set of reels) to the player when a symbol including the designated element is displayed at the selected position. Thus, this embodiment provides more opportunities for a player to obtain a winning combination in each play of a game and thereby an outcome or award in each play of the game.

In a further embodiment, the gaming device employs the award enhancement feature in a game when the player makes an optional additional wager or side bet in one or more plays of the game. The additional wager or side bet provides the player with the opportunity to obtain the award enhancement feature in a play of the game. The additional wager or side bet may be any suitable wager amount or bet amount.

In another embodiment, the gaming device designates a color associated with a symbol on a set of reels, a playing card or other suitable symbol to be the designated element in a game. If the symbol including the designated color appears or occurs at a position or positions selected by a player, the gaming device provides the award enhancement feature to the player in that play of the game. It should be appreciated that the symbols may include any suitable color or colors.

It should be appreciated that the award enhancement feature may be employed in a reel or slot game, a playing card game such as draw poker or multi-hand draw poker, keno or any other suitable game or games.

It is therefore an advantage of the present invention to provide a gaming device including at least one player selectable position and an award enhancement feature where the gaming device provides the award enhancement feature to the player if a designated element is displayed at a position selected by the player from the plurality of positions.

Additional features and advantages of the present invention are described in, and will be apparent from, the following Detailed Description and the Figures.

BRIEF DESCRIPTION OF THE FIGURES

FIG. 4B is a table illustrating a plurality of different winning card combinations and the award associated with each of the winning card combinations.

DETAILED DESCRIPTION

Gaming Device and Electronics

Figure 1A:
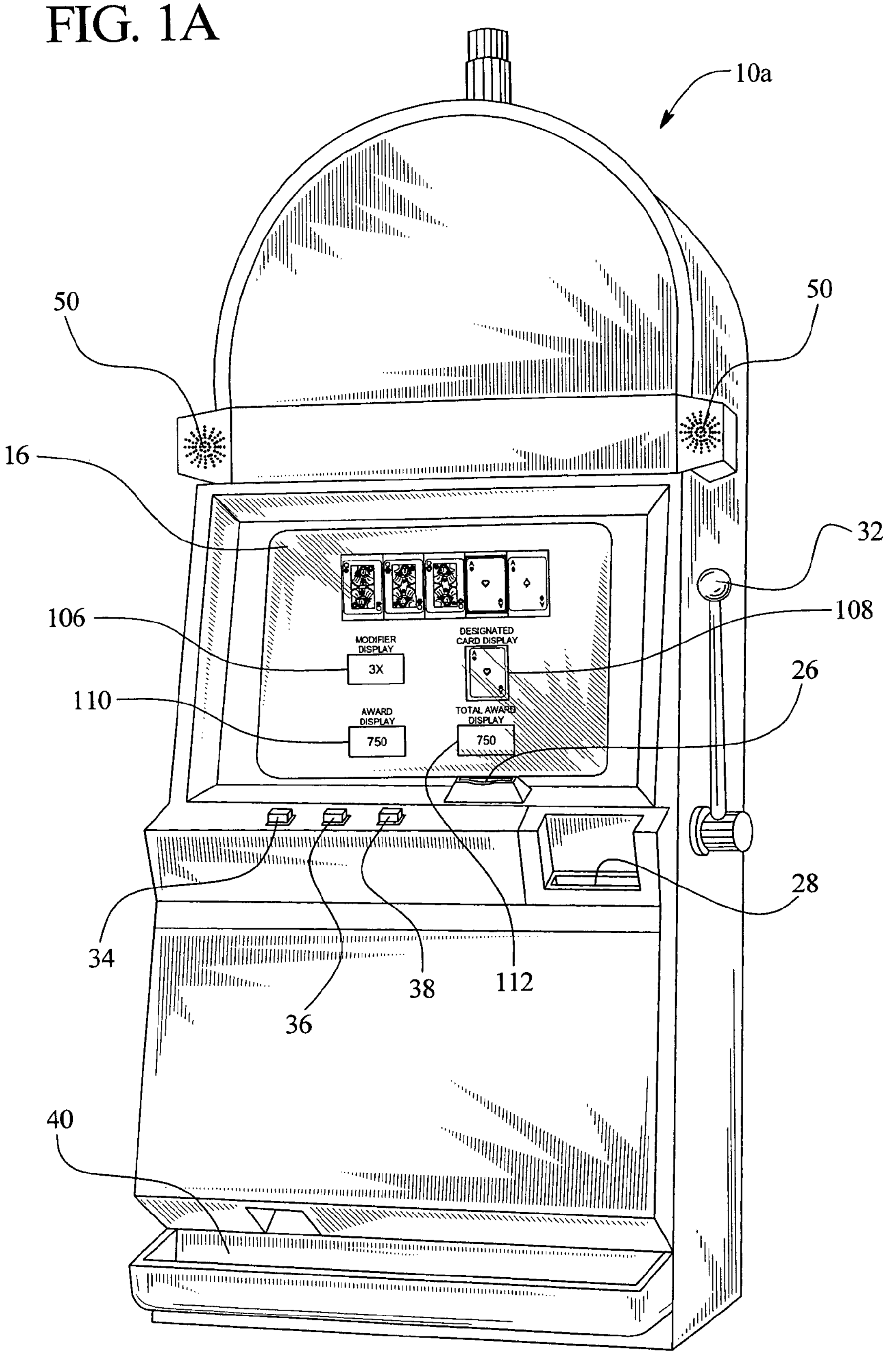
FIG. 1A is a perspective view of one embodiment of the gaming device of the present invention.
Figure 1B:
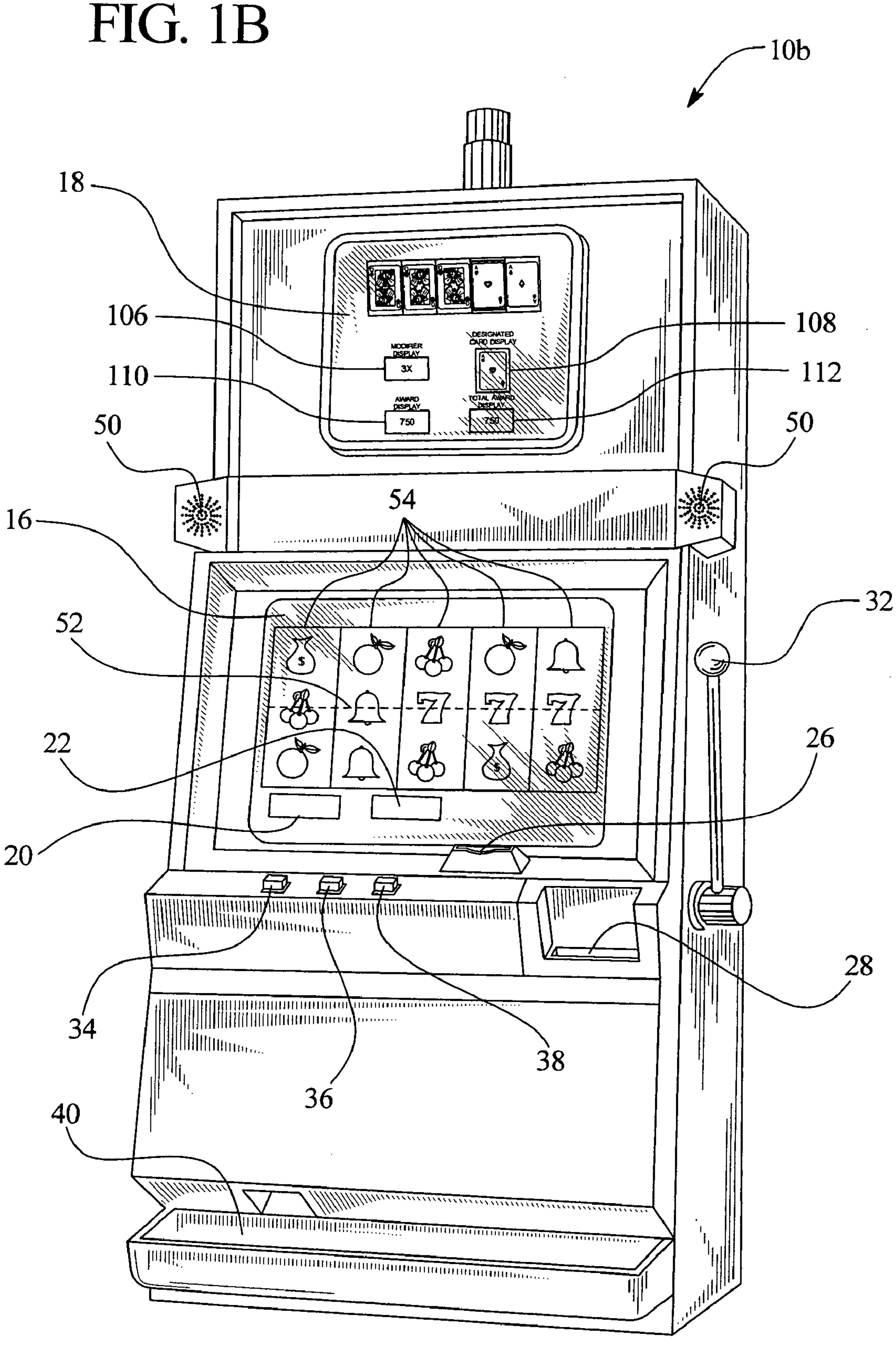
FIG. 1B is a perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
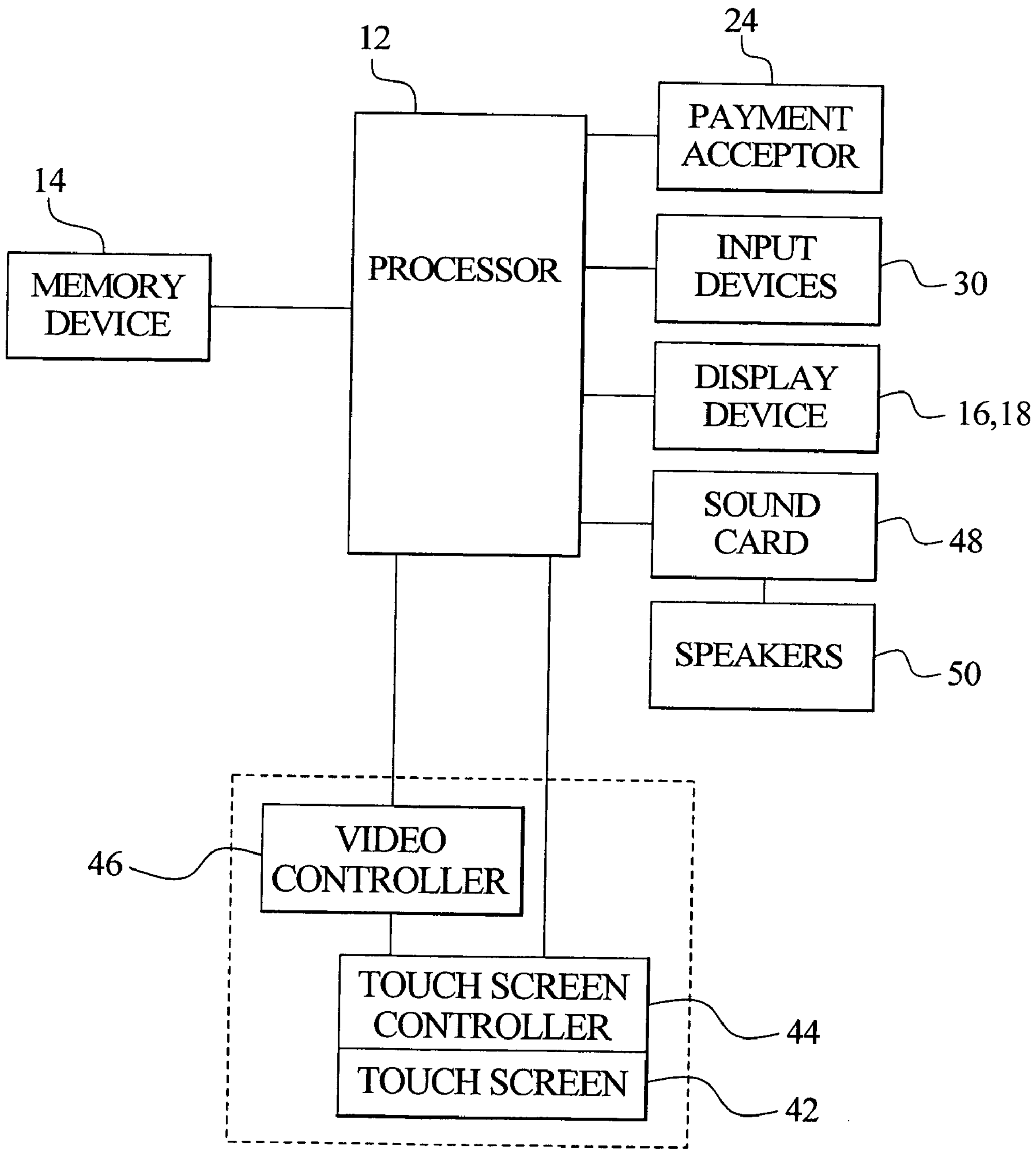
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment where the reels are in a video format, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIG. 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
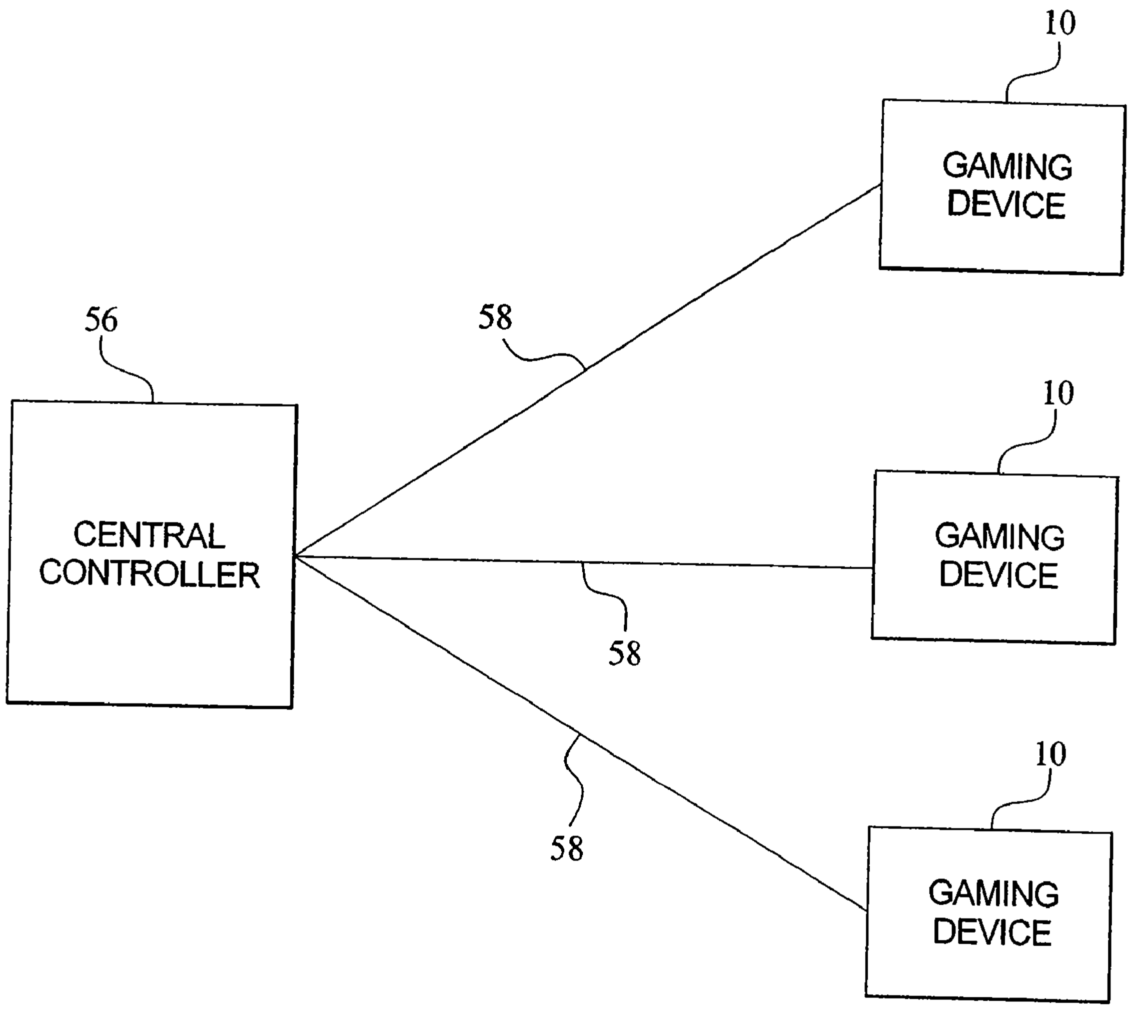
FIG. 2B is a schematic block diagram illustrating the plurality of gaming terminals and communication with a central controller.
Figure 3A:
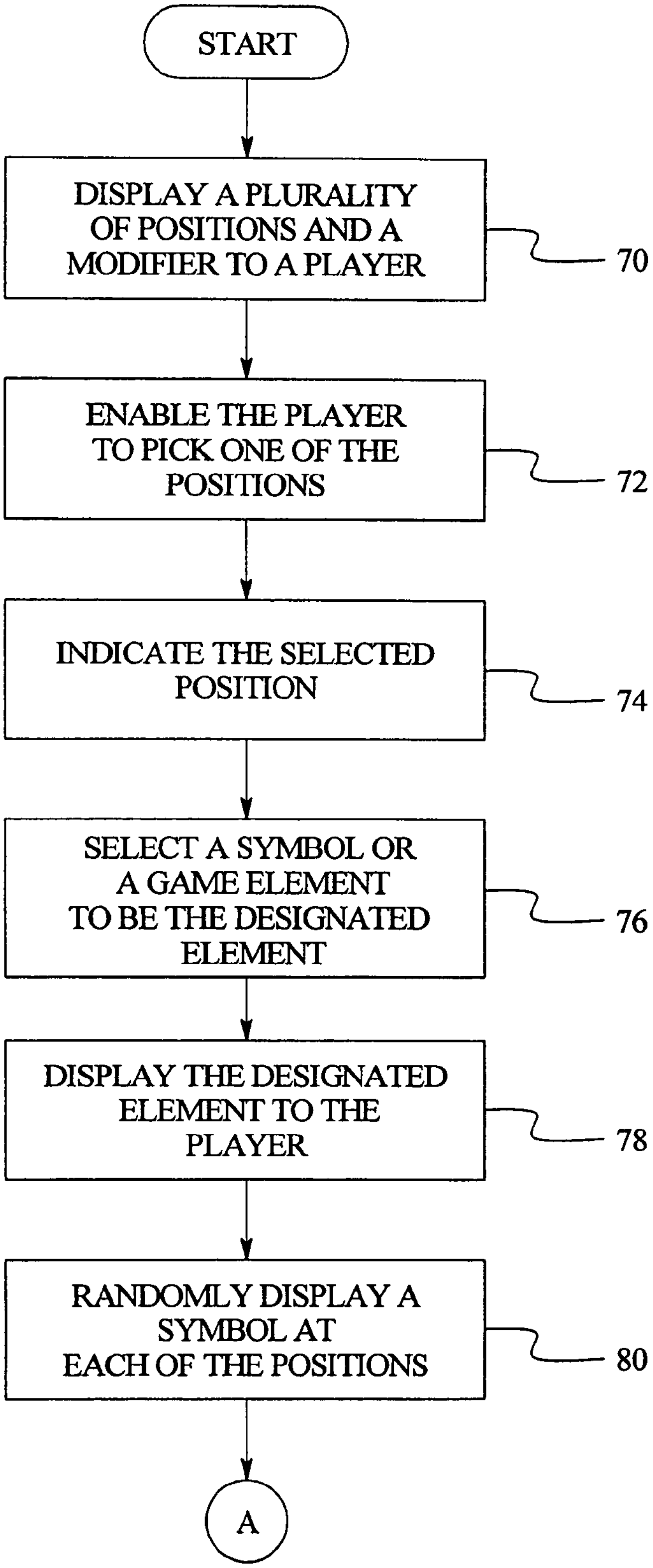
FIGS. 3A and 3B illustrate a flow chart describing one embodiment of the present invention.
Figure 3B:
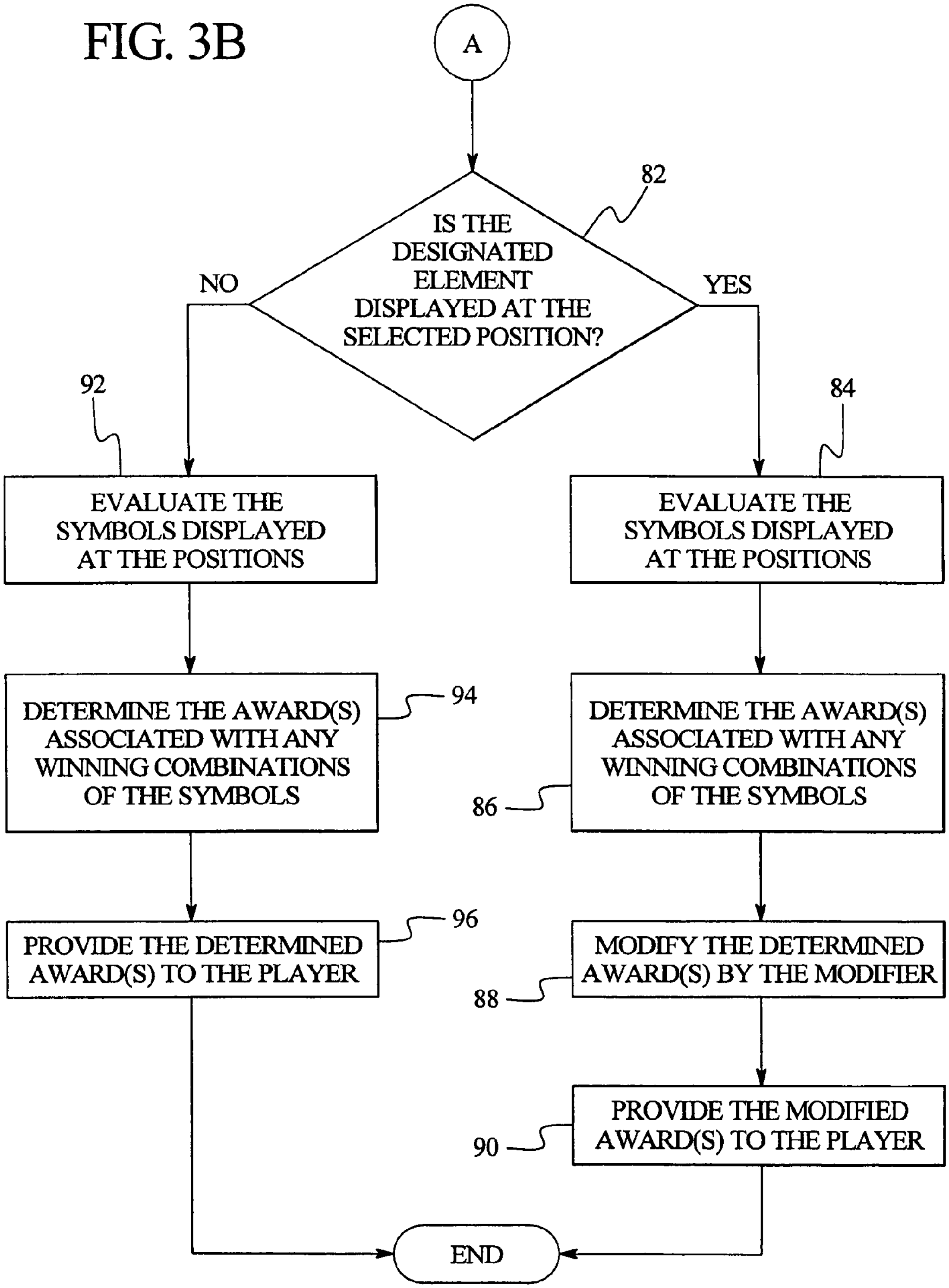

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Selectable Positions and Outcome Modifier

Referring now to FIGS. 1A, 1B, 3A and 3B, a flow chart is illustrated which describes one embodiment of the present invention. In this embodiment, the gaming device includes a processor which is operable to cause a display device to display a plurality of positions and at least one modifier to a player as described in step 70. Any suitable number of positions may be displayed to the player. It should be appreciated that the modifier may be randomly determined, pre-determined, determined based on a wager made by a player or determined in any suitable manner. After displaying the positions and modifier, the gaming device or processor enables the player to pick one of the displayed positions as described by step 72. The gaming device indicates the position selected by the player as described by step 74. The gaming device may indicate the picked or selected position by highlighting that position such as by generating a border or box around the selected position or using any other suitable indicator.

The processor selects a symbol or a game element such as a color of a symbol, a suit of a playing card or any other suitable game element, to be the designated element in that game as described by step 76. It should be appreciated that in addition or in alternative to the game elements of or associated with the symbols, one or more of the symbols can be selected as the designated element in a play of the game. For example, a symbol on a set of reels or a playing card can be selected as the designated element in a play of the game. After the designated element has been determined by the processor, the display device displays the designated element to the player as described by step 78. The player now knows the designated element that must be obtained or indicated in the selected position for the player to obtain the award enhancement feature in the game.

The gaming device randomly displays at least one symbol at each of the positions as illustrated by step 80. It should be appreciated that none, one or a plurality of symbols may be displayed at each of the positions. After the symbols are displayed at each of the positions, the gaming device or processor determines whether the designated element is displayed at the picked or selected position as described by step 82. If the designated element is displayed at the picked or selected position, the gaming device evaluates the symbols displayed at the positions as illustrated by step 84. The gaming device determines the award or awards associated with any winning symbol combinations displayed at the positions as described by step 86. It should be appreciated that the awards associated with each of the combinations of symbols may be randomly determined, predetermined or determined based on any suitable determination method. In this embodiment, the gaming device modifies the determined award or awards by the modifier because the designated element is displayed at the picked or selected position as described by step 88. The gaming device provides the modified award or awards to the player and the game ends as described by step 90.

Alternatively, if the designated element is not displayed at the picked or selected position in the play of the game, the gaming device evaluates the symbols displayed at the positions as described by step 92. The gaming device determines the award or awards associated with any winning symbol combination displayed at the positions as indicated by step 94. These awards are not modified by the modifier or the award enhancement feature because the designated element was not displayed at the picked or selected position. Therefore the determined award or awards are provided to the player and the game ends as indicated by step 96.

Accordingly, the award enhancement feature or modifier enables a player to obtain a larger award or awards in a game. This gaming device also enables a player to be an active part of the determination of the award ultimately provided to the player in the game.

Referring now to FIGS. 1A, 1B and 4A to 4C, an example of one embodiment of the present invention is illustrated. In this example, the gaming device includes a plurality of selectable positions such as positions 101*a*, 101*b*, 101*c*, 101*d* and 101*e*. The five positions 101*a*, 101*b*, 101*c*, 101*d* and 101*e* are arranged in a row and are associated with a symbol display 100. It should be appreciated that the positions may be arranged in a row, a column or any other suitable shape, pattern or configuration. As described below, the gaming device enables a player to pick at least one of the selectable positions 101*a*, 101*b*, 101*c*, 101*d* and 101*e* to provide the player with the opportunity to enhance any outcomes such as awards provided to the player in a play of the game. It should be appreciated that the gaming device may enable the player to pick one, a plurality or all of the positions in a game, enable the player to pick from one or more randomly designated positions or enable the player to pick from one or more pre-determined or pre-designated positions in a game.

Figure 4A:
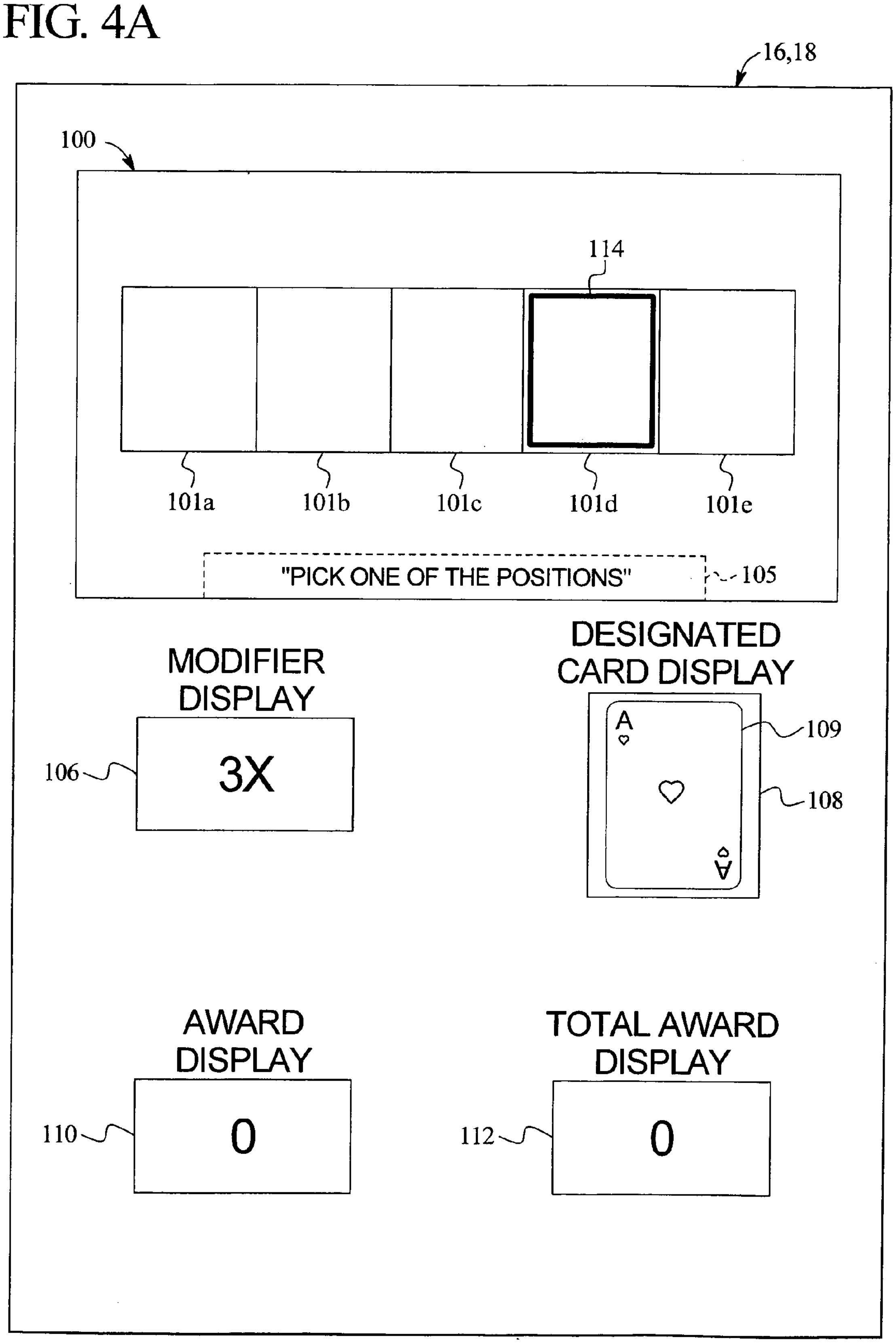
FIG. 4A is an enlarged elevation view of an example of one embodiment of the present invention illustrating a playing card game where the player picks one position in the game.

As illustrated in FIG. 4A, the gaming device displays a prompt, a message or an instruction 105 to the player on the display device to instruct and prompt the player to "Pick One of the Positions." In this example, the player picked position 101*d*. In one embodiment, the display device 16 or 18 includes a touch screen display and therefore enables the player to physically touch or press one or more of the positions to pick the position or positions in a play of the game. In another embodiment, a plurality of inputs or buttons are associated with the positions. The player presses or activates one or more of the inputs to pick one or more of the corresponding positions 101. It should be appreciated that the gaming device may enable the player to pick one or more of the positions based on any suitable selection device or selection method. After the player picks or selects one of the positions, the gaming device highlights or otherwise indicates the selected position or positions on the display device to indicate which position or positions the player picked in the play of the game. It should be appreciated that the gaming device may illuminate, highlight or otherwise indicate the selected position such as by using a border, box or window 114 shown in FIG. 4A, or any other suitable indicator. In this example, the player picked position 101*d* in this play of the game as indicated by the indicator or box 114.

After the player picks one of the positions, the gaming device randomly selects and displays at least one symbol such as a playing card as the designated element in the play of the game. As shown in FIG. 4A, the gaming device displays one of the playing cards from a conventional deck or set of playing cards as the designated element or designated playing card in the play of the game as indicated by designated card display 108. In this example, the gaming device randomly selects and displays the ace of hearts playing card 109 to be the designated element or designated playing card in this play of the game as indicated by the designated card display 108. Therefore, if the ace of hearts appears, occurs or is displayed at the position selected by the player, the gaming device provides the modifier or multiplier indicated by the modifier display 106 to the player in the play of the game. It should be appreciated that the designated element could be any suitable symbol or playing card such as an Ace where the gaming device provides the modifier to the player when any one of the aces such as the ace of hearts, ace of diamonds, ace of spades or ace of clubs is displayed at the selected position in the play of the game.

In another embodiment, the gaming device randomly selects and displays a plurality of symbols and/or game elements as the designated elements in a play of the game. In this embodiment, the gaming device provides the modifier to the player when any one of the designated elements is displayed by the position or positions picked by the player in the game.

In the illustrated example, the gaming device provides the multiplier of 3× indicated by the modifier display 106 to the player in this play of the game if the designated card (i.e., an Ace) is displayed or otherwise indicated at the position selected by the player. It should be appreciated that the modifier may be a multiplier, a value or award, or any other suitable modifier. It should also be appreciated that the modifier may be randomly determined, predetermined, determined based on a wager made by the player or based on any suitable determination method. The gaming device modifies any outcomes, such as any awards associated with any winning symbol combinations or winning hands displayed by the positions of the symbol display 100, by the modifier when the designated card is displayed at the position selected by the player. For example in FIG. 4A, the gaming device multiplies any award associated with a winning hand or winning combination of the playing cards displayed at positions 101*a*, 101*b*, 101*c*, 101*d* and 101*e* by the multiplier of 3× in this play of the game to provide an enhanced or modified award to the player in the game. The player has not earned or obtained an award in the game as indicated by the award display 110 and the total award display 112.

If the designated playing card does not appear or is not indicated or displayed at the position selected by the player, the gaming device does not modify or enhance the outcome or award, if any, provided to the player in that play of the game. In this circumstance, the gaming device evaluates the playing cards displayed by the symbol display 100 at the positions 101 to determine if any winning symbol combinations are indicated. If a winning symbol combination is indicated by the symbol display 100, the gaming device provides the award associated with that winning hand or winning symbol combination to the player. The winning card combinations and associated awards for this example are illustrated in FIG. 4B.

Referring now to FIG. 4B, a pay table or payout display is illustrated where the pay table includes a plurality of winning symbol or card combinations and a plurality of outcomes such as awards associated with each of the winning card combinations. For example, a card combination forming a royal flush provides an award of five thousand credits. A straight flush provides an award of one thousand credits. Four of a kind, (i.e., four cards having the same number such as four kings) provides an award of five hundred credits. A full house, which is a group of playing cards including three cards having the same number combined with two other cards each having the same number, provides an award of two hundred fifty. A flush, which is a group of playing cards all including the same suit, provides an award of one hundred fifty credits. A straight, which is a group of playing cards in consecutive order such as a king, queen, jack, ten and nine in a five card hand, provides an award of one hundred credits. A group of playing cards including three of a kind or three cards having the same number such as three jacks, provides an award of fifty credits. A playing card hand or group of playing cards including two pair such as two jacks and two aces, provides an award of twenty-five credits to the player. A playing card hand including one pair including Jacks or better such as two Queens, provides an award of ten credits. It should be appreciated that any suitable winning combinations of symbols, game elements or winning card combinations may be employed by the present invention and any suitable award or awards that may be associated with each of the winning combinations.

Figure 4C:
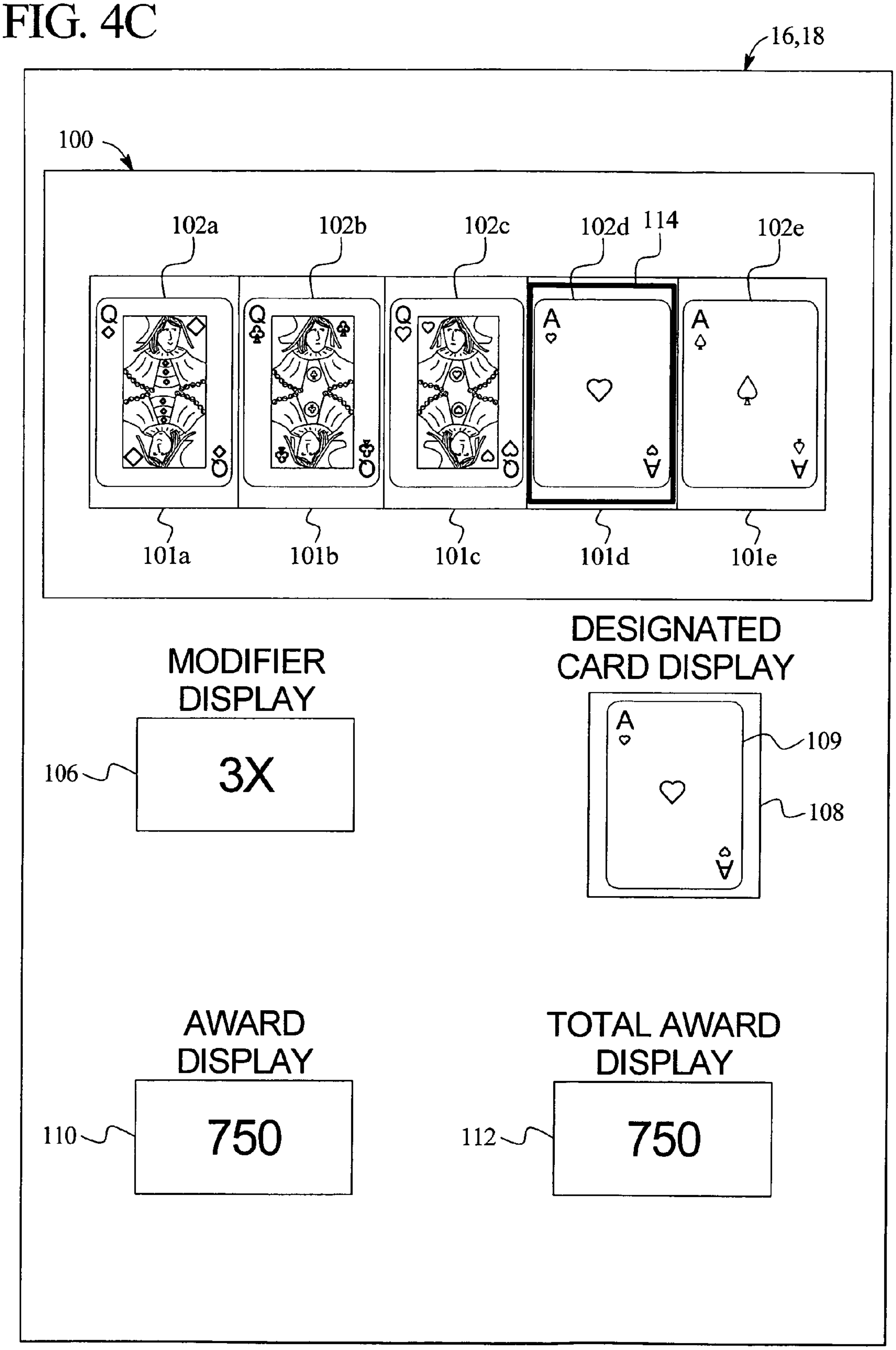
FIG. 4C is an enlarged elevation view illustrating the example of FIG. 3A where the designated playing card displayed at the position selected by the player.

Referring now to FIG. 4C, the gaming device randomly generates and displays one of the playing cards at each of the positions 101*a*, 101*b*, 101*c*, 101*d* and 101*e*. In this example, after the gaming device displays the playing cards at the positions, the ace of hearts (i.e., the designated card as indicated by the designated card display 108) appears or occurs in the selected position including play card 102*d*. Therefore, the gaming device will modify any awards provided to the player in this game by the modifier or multiplier of 3×. The gaming device evaluates the playing cards indicated in the playing card hand displayed at each of the positions of the symbol display 100. In this example, the playing card hand includes the queen of diamonds labeled as 102*a*, the queen of clubs labeled as 102*b*, a queen of hearts labeled as 102*c*, an ace of hearts labeled as 102*d*, and an ace of spades labeled as 102*e*. This playing card combination forms a full house having three queens and two aces. As illustrated in FIG. 4B, a full house is a winning card combination and provides an award of two hundred fifty credits. Thus, the award of two hundred fifty credits is multiplied by the multiplier of 3× indicated by the modifier display 106 to give the player an award of seven hundred fifty credits for this play of the game. The award of seven hundred fifty credits is indicated by the award display 110 and is also added to the player's total award and displayed by the total award display 112.

After any awards are provided to the player, the gaming device resets the positions to remove the playing cards displayed by the symbol display and any highlighting associated with one or more of the positions selected by the player in that play of the game. It should be appreciated that the gaming device may reset the positions, the displayed playing cards and/or the highlighting after each play of the game or after a plurality of plays of the game. The gaming device then enables the player to pick one or more of the positions in the next play of the game if the player makes the appropriate wager. As described above, the player obtained a relatively large award in this example because the player obtained the modifier by picking the position which ultimately displayed the designated symbol or card in the play of the game.

It should be appreciated that the gaming device may employ the award enhancement feature in one play of a game, a plurality of plays of the game or in each play of a game. It should also be appreciated that the award enhancement feature may be randomly initiated by the gaming device or initiated based upon a wager made by the player in the game such as when a player makes the maximum wager in the game.

In another embodiment, the gaming device enables the player to pick one or a plurality of the positions in a play of the game. In this embodiment, the gaming device provides a predetermined or randomly determined initial or base modifier such as a multiplier of 1× to the player, and increments the modifier or multiplier based on the number of designated symbols, cards or game elements displayed at the selected positions in the play of the game. For example, the gaming device or processor sets the initial modifier at 1× and enables the player to pick one or more of the positions. The player picks three positions in this play of the game. If the designated card or symbol is displayed at one of the selected positions, the gaming device increments the multiplier by one from 1× to 2×. If the designated symbol or card is displayed at two of the selected positions, the gaming device increments the modifier or multiplier by two from 1× to 3×. If the designated symbol or card is displayed at all three of the selected positions, the gaming device increments the modifier or multiplier by three from 1× to 4×. It should be appreciated that the gaming device may increment the modifier or multiplier by a predetermined amount, a randomly determined amount, based on a wager made by the player or any other suitable amount. It should also be appreciated that the gaming device may increase or decrease the modifier or multiplier by a randomly determined or predetermined amount. It should further be appreciated that the amount of the increments may be a predetermined amount, a randomly determined amount, an amount based on a wager made by the player, or any other suitable amount or amounts.

As described above, in one embodiment, the gaming device includes an input such as a button associated with each of the positions to enable a player to press or activate one or more of the buttons to pick one or more of the corresponding positions in a play of the game. In this embodiment, the player presses the input or button associated with the desired position to highlight or otherwise indicate that the position has been selected in that play of the game. In another embodiment, the display device includes a touch screen and enables the player to pick or select the position or positions directly on the display device or touch screen by pressing or activating the positions on the touch screen. It should be appreciated that any suitable input or input device may be employed by the present invention to enable a player to pick one or more of the positions in a game.

In another embodiment, the gaming device enables the player to pick a designated number of the positions in a play of the game based on a wager made by the player in that play of the game. For example, if the player wagers one credit, the gaming device enables the player to pick one of the positions in that play of the game. If the player wagers two credits, the gaming device enables the player to pick two of the positions in that play of the game. In one embodiment, the award enhancement feature is provided when the player makes an optional additional wager, side bet or side wager in one or a plurality of the plays of the game. It should be appreciated that the gaming device may enable the player to pick one, a plurality or all of the positions based on any suitable credit or wager amount. In another embodiment, the gaming device randomly determines or selects one, a plurality or all of the positions in a play of the game. In a further embodiment, the gaming device randomly determines or selects one, a plurality or all of the positions to activate, highlight or otherwise indicate in a play of the game based on a wager made by the player in that play of the game.

In one embodiment, the modifier is a randomly determined or predetermined multiplier. It should be appreciated that the modifier may be a multiplier, an amount or value which is added to a player's award in a play of the game, an amount or value which is subtracted from a player's award in a play of the game, or any other suitable modifier or modifiers. In one embodiment, the modifier includes a symbol or symbols which are evaluated with the other symbol or symbols displayed by the symbol display at the positions. The additional symbol or symbols enhances a player's chances of obtaining a winning symbol combination in that play of the game.

Figure 5A:
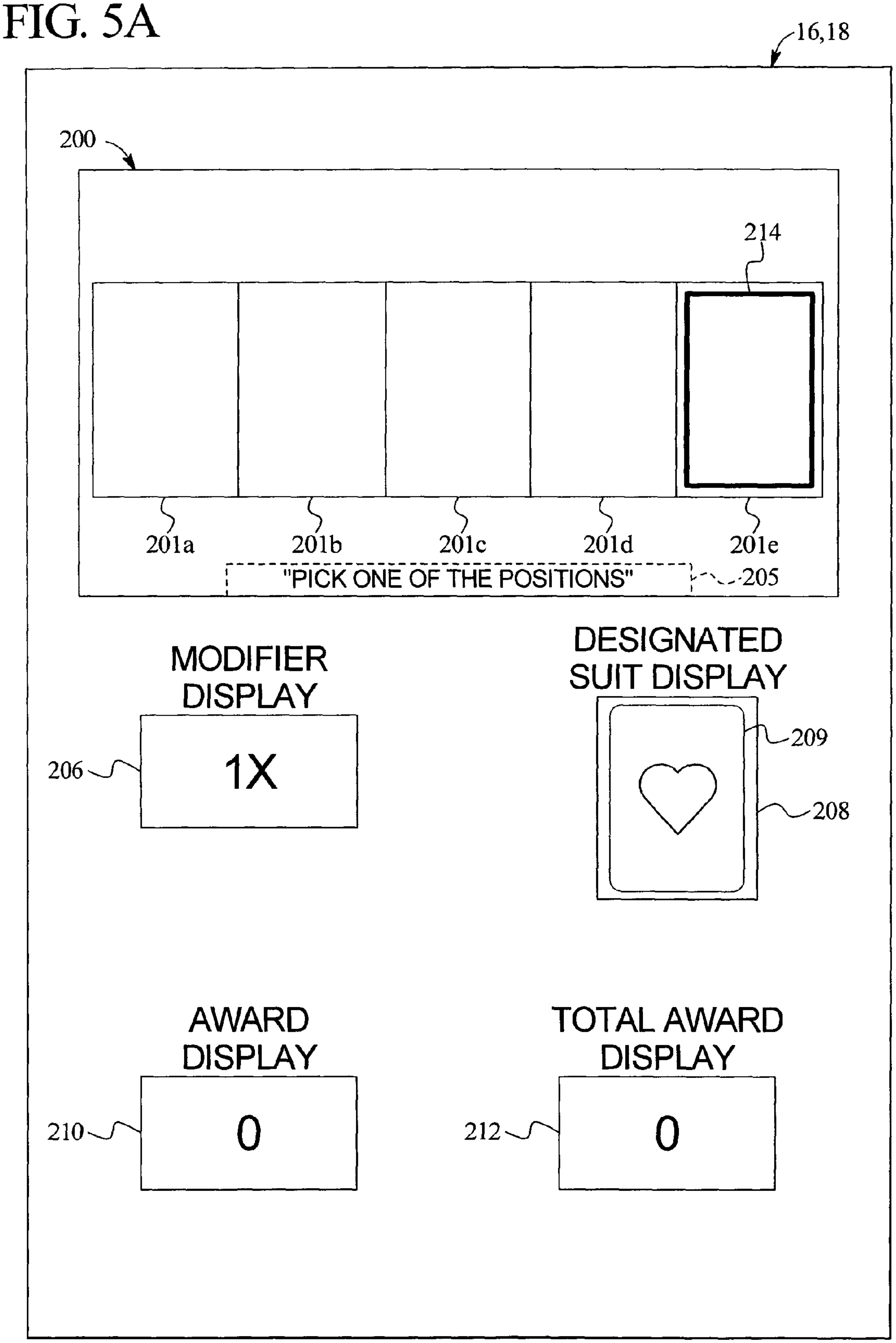
FIG. 5A is an enlarged elevation view of an example of another embodiment of the present invention where one of the characteristics of the playing cards is the designated element in the game.
Figure 5B:
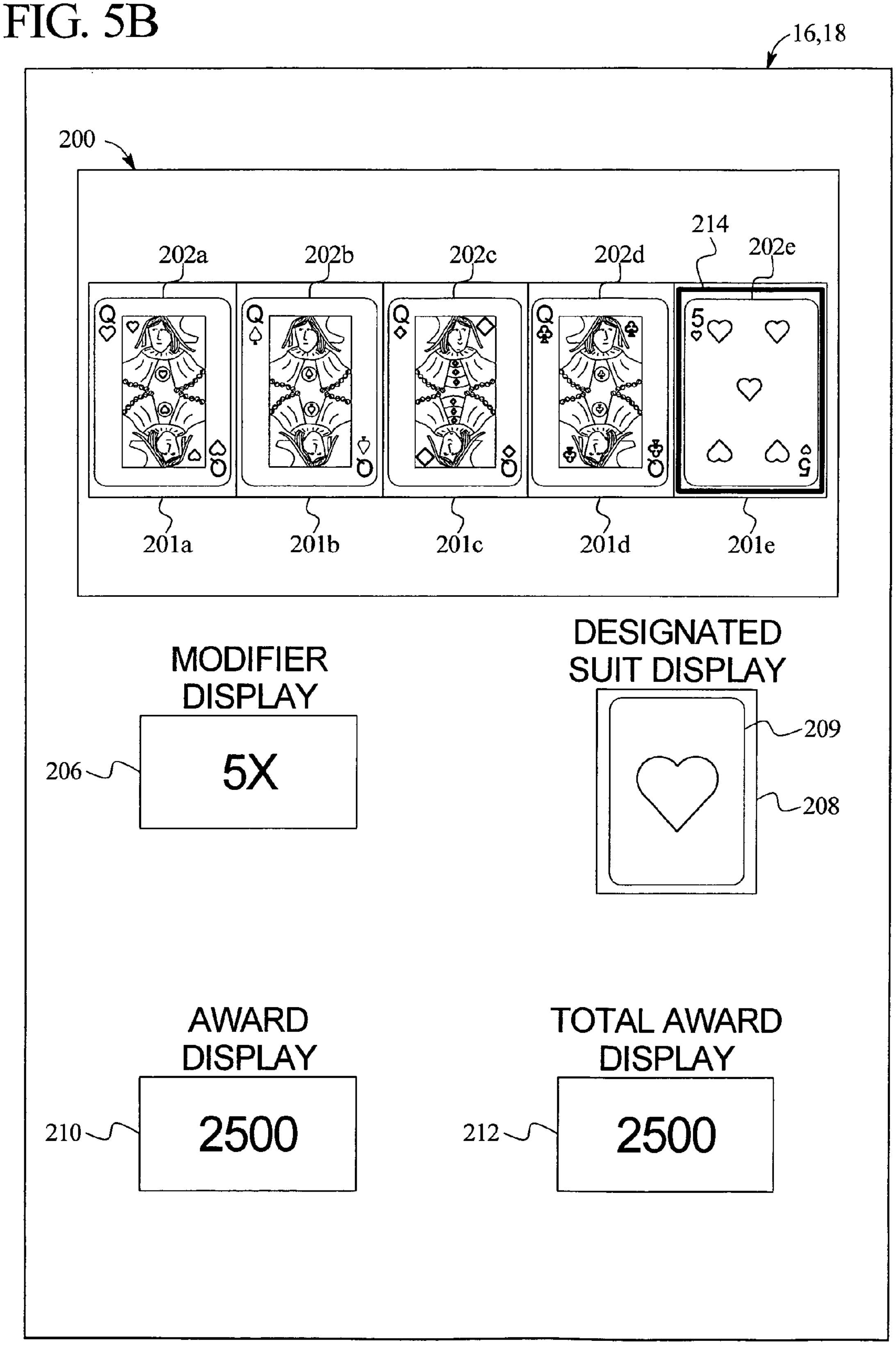
FIG. 5B is an enlarged elevation view illustrating an example of FIG. 4A where the playing card including the designated playing card suit is displayed at the position selected by the player.

Referring now to FIGS. 5A and 5B, an example of another embodiment of the present invention is illustrated where the gaming device randomly selects a game element or characteristic of the playing cards to be the award enhancement feature, designated element or designated suit in the play of the game. For example, the gaming device randomly picks one of the playing card suits such as hearts, diamonds, spades and clubs to be the designated playing card suit in a play of the game. As shown in FIG. 5A, the gaming device includes a symbol display 200 and a plurality of positions 201*a*, 201*b*, 201*c*, 201*d* and 201*e*. The symbol display randomly displays a plurality of playing cards 202*a*, 202*b*, 202*c*, 202*d* and 202*e* at the positions in the game. As described above, a box, border or other suitable indicator 214 is used to indicate or display the position or positions selected by the player in that play of the game. The modifier display 206 displays or indicates the determined or designated modifier for the play of the game. The designated suit display 208 indicates the playing card suit selected by the gaming device in that play of the game. It should be appreciated that the gaming device or the player may select the designated playing card suit in the game. It should also be appreciated that the gaming device or player may select the designated playing card suit in one, a plurality or all of the plays of the game. In the illustrated embodiment, an award display 210 indicates the award, if any, provided to the player in that play of game. A total award display 212 indicates the total award accumulated by the player in one or more plays of the game.

In one embodiment, the gaming device provides the determined or designated modifier to the player when the designated suit indicated by the designated suit display 208 is displayed at least one of the positions picked by the player. In this embodiment, the modifier or multiplier provided to the player in the play of the game is based on a value or number associated with the playing cards displayed at the positions.

In one example, if the ten of hearts is displayed at the selected position, and the designated suit is hearts, the gaming device provides a modifier or multiplier of 10× to the player in that play of the game. If one of the face cards such as a king, a queen, a jack or an ace is displayed at the selected position, the gaming device provides a randomly determined or a predetermined modifier to the player. For example, the gaming device may provide a multiplier of 50× for a king, a multiplier of 40× for a queen, a multiplier of 30× for a jack, and a multiplier of 100× for an ace. It should be appreciated that any modifier or multiplier may be associated with one or more of the playing cards in the play of the game.

Referring now to FIG. 5A, the gaming device enables the player to pick one of the positions 201*a*, 201*b*, 201*c*, 201*d* and 201*e* as indicated by message 205. The gaming device randomly selects and displays one of the playing card suits. In this example, the gaming device selects the playing card suit of hearts which is labeled as 209 and indicated by the designated suit display 208. The gaming device also provides a base modifier or multiplier of 1× as indicated by the modifier display 206.

Referring now to FIG. 5B, the display device or symbol display 200 displays a plurality of playing cards 202*a*, 202*b*, 202*c*, 202*d* and 202*e* at each of the positions 201*a*, 201*b*, 201*c*, 201*d* and 201*e*. The displayed playing cards form a player's playing card hand in a play of the game and are evaluated based on the winning symbol or card combinations indicated by the table in FIG. 4B. A box, border or other indicator 214 is used to indicate the position 202*e* selected by the player in the game. The gaming device evaluates the positions to determine if the designated suit (which is hearts as indicated by the designated suit display 208) is displayed at the selected position 202*e.*

As illustrated in FIG. 5B, the symbol display 200 displays a queen of hearts labeled 202*a* at position 201*a*, a queen of spades labeled 202*b* at position 201*b*, a queen of diamonds labeled 202*c* at position 201*c*, a queen of clubs labeled 202*d* at position 201*d* and a five of hearts labeled 202*e* at position 201*e*. Therefore, the five of hearts is displayed at the selected position 202*e*. Because the suit of playing card 202*e* (i.e., hearts) displayed at the selected position 202*e* matches or is the same as the designated suit (i.e, hearts) 209 indicated by the designated suit display 208, the gaming device provides the award enhancement feature or multiplier to the player in this play of the game.

In this example, the modifier or multiplier is based on the number or value associated with the playing card displayed at the selected position 202*e*. The number or value of five is associated with that playing card (i.e., the five of hearts). Therefore, the modifier or multiplier becomes a multiplier of 5×. The gaming device evaluates the playing cards displayed at the positions which form the playing card hand to determine if any winning card combinations are indicated in this play of the game. The playing card hand includes four queens or four of a kind which is a winning combination of cards as indicated by the table of FIG. 4B. Therefore, the gaming device provides an award of five hundred such as five hundred credits to the player as illustrated by the table in FIG. 3B. The award of five hundred is multiplied by the modifier of 5× (because the player obtained the award enhancement feature in this play of the game) to provide the player with an award of two thousand five hundred as indicated by the award display 210. The award of two thousand five hundred is added to the player's total award of zero to give the player a total award of two thousand five hundred as indicated by the total award display 212.

As illustrated by the above embodiments, the probability of obtaining the award enhancement feature such as a modifier in a play of the game is based on the designated element in the play of the game such as whether the designated element is a designated symbol or a designated playing card suit in the game. For example, when the designated element is a designated playing card from a conventional deck of fifty-two playing cards and the gaming device enables the player to pick one of the positions or card positions in the play of the game, the probability of the designated playing card being displayed at the position picked by the player is 1/52 or 1.92% prior to any cards being dealt. Therefore, the probability that the player will obtain the award enhancement feature such as a modifier in that play of the game is 1.92%.

When the designated element is a designated playing card number or value such as any playing card having the number four (i.e., four of hearts, four of diamonds, four of spades, four of clubs), the probability of the designated playing card number being displayed at a single position selected by the player is 1/13 or 7.69%. The probability of obtaining the award enhancement feature is therefore 7.69%. Furthermore, when the designated element is a designated playing card suit such as hearts, diamonds, spades or clubs, the probability of the designated player card suit being displayed at a single position selected by the player is 1/4 or 25.00%. Accordingly, the probability of obtaining the award enhancement feature is 25.00%. Thus, the probability of obtaining the award enhancement feature can be determined and/or changed based on the designated element in each play of the game.

Additionally, in one embodiment, the award enhancement feature or modifier can change based on the particular designated element in a game. For example, a larger modifier is provided to the player in a play of the game when the designated element is a designated playing card because the designated playing card is more difficult to obtain in a play of the game based on the probability described above. Similarly, a smaller modifier is provided to the player when the designated element is a designated playing card suit which has a greater probability of being displayed at a selected position. It should be appreciated that the award enhancement feature or modifier may be randomly determined, pre-determined, determined based on a wager made by the player or determined in any suitable manner based on the probability of the designated element being displayed at a selected position in a play of the game.

Figure 6:
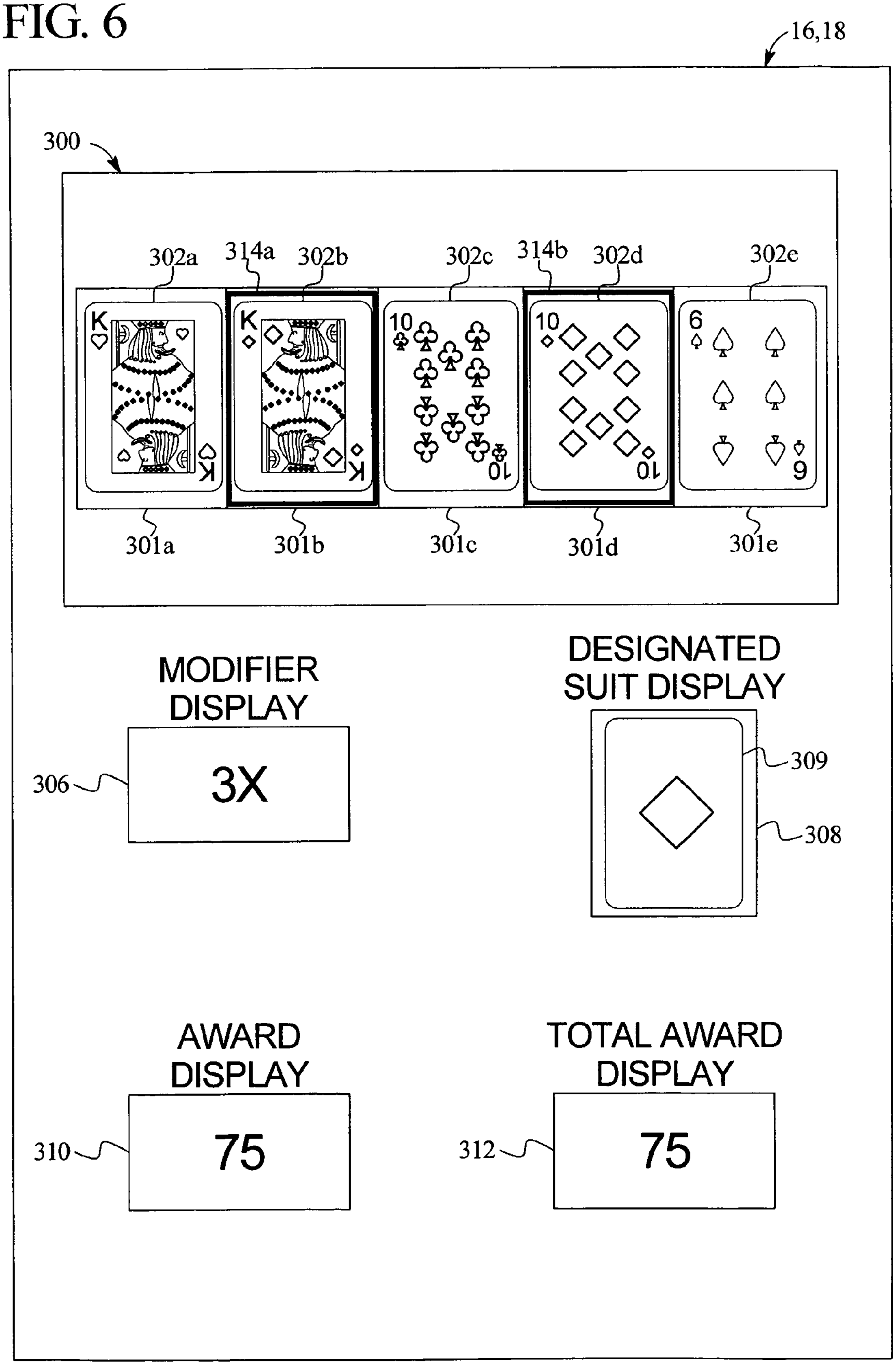
FIG. 6 is an enlarged elevation view of an example of a further embodiment of the present invention where the gaming device enables a player to pick a plurality of positions in a play of a game.

Referring now to FIG. 6, an example of another embodiment of the present invention is illustrated where the gaming device enables a player to pick a plurality of the positions in a play of the game. In this embodiment, the gaming device includes a symbol display 300 which displays one or more elements such as game elements at positions 301*a*, 301*b*, 301*c*, 301*d* and 301*e*. In this embodiment, the gaming device predetermines or randomly determines the number of positions which are selectable by a player in the play of the game. It could be appreciated that the number of positions selectable by the player in a play of the game may be one, a plurality or all of the positions. It should also be appreciated that the number of selectable positions may be randomly determined, pre-determined, determined based on a wager made by a player or based on any suitable determination method. The gaming device also includes a modifier display 306 which indicates the modifier provided to the player in that play of the game the designated symbol, designated card or designated suit is displayed. A designated element display such as the designated suit display 308 is displayed to a player. The gaming device also includes an award display 310 and a total award display 312 similar to the displays described above.

In the illustrated example, the gaming device enables the player to pick a plurality of the positions. In one example, the player picks positions 301*b* and 301*d*. Boxes or indicators 314*a* and 314*b* indicate or otherwise highlight the selected positions 301*b* and 301*d*, respectively. In this example, the gaming device randomly determines or predetermines an initial or base modifier to provide to the player in the play of the game such as a multiplier of 1×. It should be appreciated that the initial or base multiplier may be any suitable modifier or multiplier and have any suitable value. In this example, the gaming device increments or increases the modifier or multiplier by one for each designated element, such as the designated playing card suit indicated by the designated suit display 308, that is displayed at the selected positions.

As shown in FIG. 6, the gaming device initially provides a multiplier 1× which is incremented or increased by two from 1× to 3× because each of the selected positions 301*b* and 301*d* display a diamond symbol which matches or is equal to the designated playing card suit 309 indicated by the designated suit display 308. It should be appreciated that the modifier or multiplier may be incremented or changed based on a predetermined amount, randomly determined amount or any other suitable amount. As illustrated in FIG. 6, the playing cards which form the playing card hand indicate a king of hearts labeled 302*a*, a king of diamonds labeled 302*b*, a ten of clubs labeled 302*c*, a ten of diamonds labeled 302*d*, and a six of spades labeled 302*e*. This card combination indicates two pairs of playing cards (i.e., two kings and two tens). A card combination including two pairs is a winning card combination which provides twenty-five credits to the player as illustrated by the table in FIG. 4B. Therefore, the award of twenty-five credits is multiplied by 3× to provide an award of seventy-five to the player as indicated by the award display 310. The award of seventy-five is added to the player's total award of zero to give the player a total award of seventy-five as indicated by the total award display 312. As described above, obtaining the modifier (i.e., the award enhancement feature) enhanced the player's award in this play of the game and thereby increased the player's excitement and enjoyment of the game.

Figure 7A:
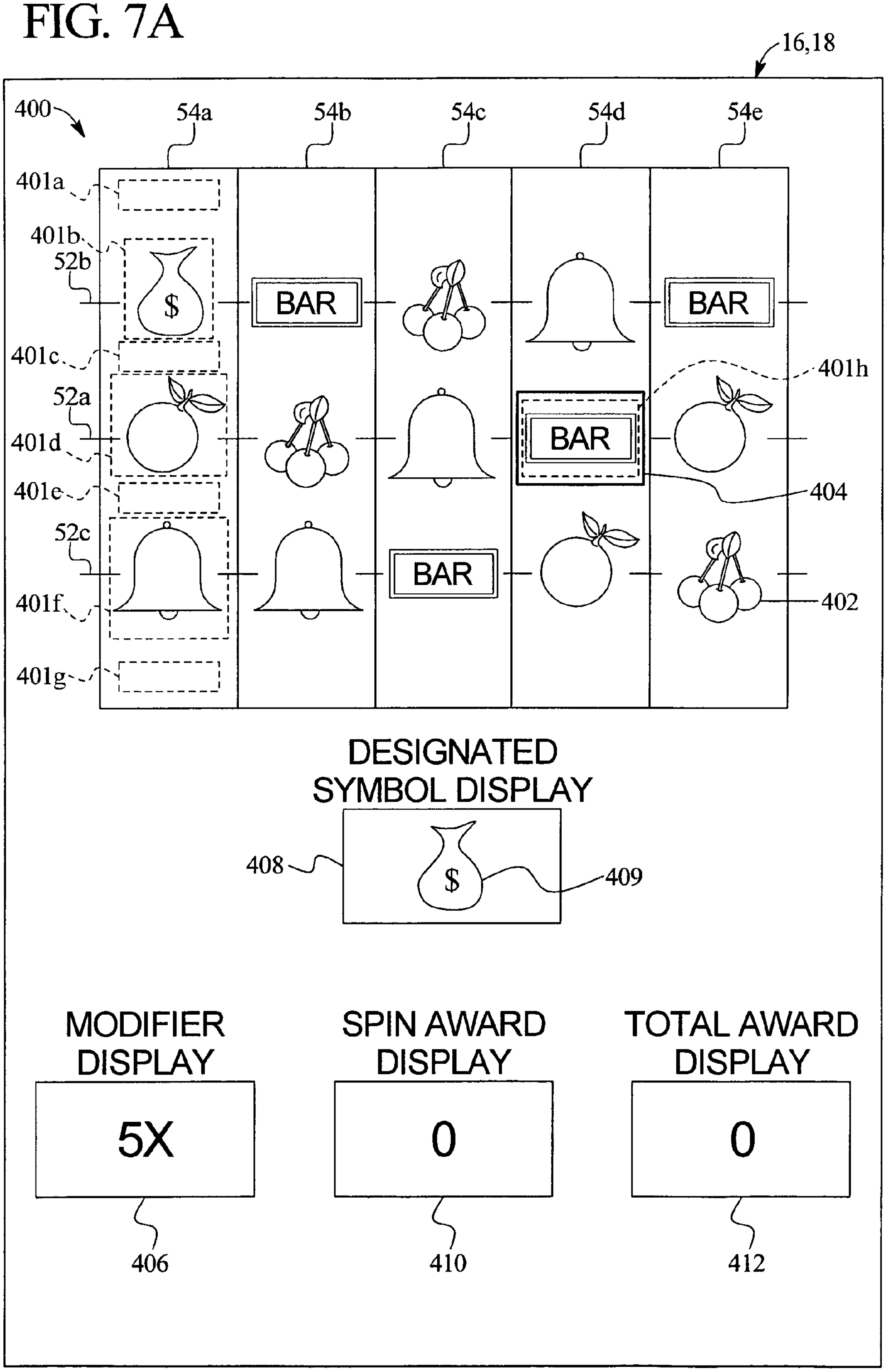
FIG. 7A is an enlarged elevation view of an example of an alternative embodiment of the present invention where the gaming device enables a player to pick at least one position associated with a set of reels in a play of a game.

Referring now to FIG. 7A, an alternative embodiment of the present invention is illustrated where a plurality of reels 54*a*, 54*b*, 54*c*, 54*d* and 54*e* of symbol display 100 are displayed to the player in a play of the game. The gaming device also includes a plurality of selectable positions such as positions 401*a*, 401*b*, 401*c*, 401*d*, 401*e*, 401*f* and 401*g*, which are associated with the symbol display. A plurality of paylines 52*a*, 52*b* and 52*c* are associated with the reels and indicate or display different symbol combinations in a play of the game. The reels 54*a*, 54*b*, 54*c*, 54*d* and 54*e* include a plurality of symbols 402 such as a money bag symbol, a cherry symbol, an orange symbol, a bell symbol and a bar symbol. It should be appreciated that the symbols may be any suitable symbols or images. The gaming device also includes a designated symbol display 408 which indicates or displays a predetermined or randomly determined designated symbol such as the money bag symbol 409 in a play of the game. The gaming device further includes a modifier display 406 which indicates a modifier or multiplier provided to player in that play of the game if the player triggers the award enhancement feature described above. The gaming device also includes a spin award display which indicates the award obtained by the player in that spin or play of the game and a total award display 412 which indicates the total accumulated award by the player in one or more games.

Figure 7B:
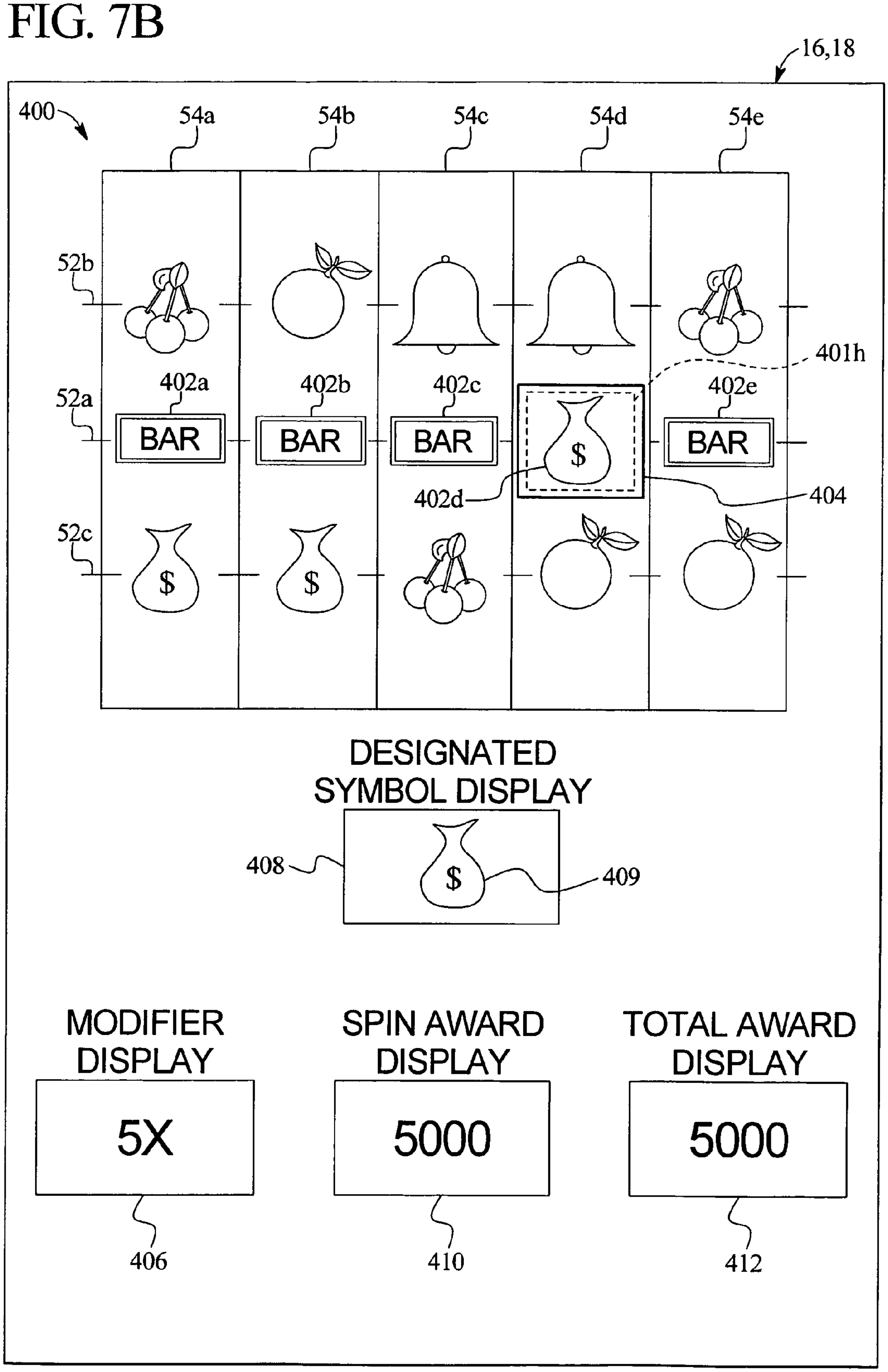
FIG. 7B is an enlarged elevation view of the example of FIG. 6A where the designated symbol is displayed at the position selected by the player.

In one example of this embodiment illustrated in FIGS. 7A, 7B and 7C, the gaming device enables the player to pick at least one of the plurality of positions 401 in the play of the game. The gaming device randomly selects and displays one of the symbols on the reels as the designated symbol in the game. As described above, the designated symbol in this example is the money bag symbol 409. If the designated symbol (i.e., the money bag symbol) is displayed at the selected position, the gaming device provides the multiplier or modifier of 5× indicated by the modifier display 406 to the player in that play of the game. The gaming device modifies or multiplies any awards provided to the player in that play of the game by the modifier or multiplier to enhance the player's award in that play of the game. This provides further excitement enjoyment for the player because the player has the opportunity to obtain a relatively large award in the game.

Referring to FIGS. 7A and 7B, in the illustrated example, the gaming device enables the player to pick one of the positions 401. The gaming device may display a message or prompt to the player as described above to indicate to the player how many positions the player can pick in a play of the game. In this example, the player picks position 401*h*. A box, border or indicator 404 indicates the position picked by the player. After the player's pick, the gaming device randomly determines the money bag symbol 409 to be the designated symbol in this play of the game as indicated by the designated symbol display 408. The gaming device or player activates the reels 54*a*, 54*b*, 54*c*, 54*d*, and 54*e* in the play of the game to display a plurality of symbols or symbol combinations on the reels to the player.

In the illustrated example, when the reels stop moving, a money bag symbol 402*d* appears or otherwise occurs in the selected position 401*h*. The money bag symbol 402*d* matches the designated symbol displayed by the designated symbol display 408. The gaming device therefore provides the modifier or multiplier of 5× indicated by the modifier display 406 to the player in this play of the game. The gaming device now evaluates the symbol combinations indicated by the paylines to determine if the player obtained an award or awards in this play of the game. Specifically, payline 52*a* indicates a bar symbol 402*a*, a bar symbol 402*b*, a bar symbol 402*c*, a money bag symbol 402*d* and a bar symbol 402*e*. A symbol combination including four bar symbols is a winning symbol combination in this play of the game as illustrated by FIG. 4B. The winning symbol combination including four bar symbols provides an award of one thousand credits. The other paylines do not indicate winning symbol combinations in this play of the game. Therefore, the gaming device multiplies the award of one thousand by the modifier or multiplier of 5× to provide the player with a spin award of five thousand as indicated by the spin award display 410. The spin award of five thousand is added to the player's total award of zero to give the player a total award of five thousand as indicated by the total award display 412.

In one embodiment, the gaming device enables the player to pick one position as described above. It should be appreciated that the gaming device may enable the player to pick one, a plurality or all of the positions associated with the reels in the play of a game. In another embodiment, the gaming device enables the player to pick one or more of the reels 54 in a play of the game to activate the selected reels. If the designated symbol is displayed at a selected symbol position associated with the selected reel or reels, the gaming device provides a modifier such as the multiplier to the player in that play of the game. Alternatively, in another embodiment, the gaming device enables the player to pick one or more of the paylines associated with the reels in the play of the game to activate the selected payline or paylines in that play of the game. If the designated symbol is displayed at a selected position that occurs on the selected payline, the gaming device provides the modifier or award to the player in that play of the game.

The probability that the designated symbol will be displayed at a particular position selected by the player is based on a designated probability associated with each of the symbols. For example, if the probability associated with the designated symbol is 10.00%, then the probability that the designated symbol will occur at a single position associated with the reels is 10.00%. Therefore, the probability associated with the designated symbol affects the probability of the player obtaining the award enhancement feature in that play of the game. It should be appreciated that the designated probability associated with each symbol may be predetermined, randomly determined, determined based on a wager made by a player or determined in any suitable manner.

Figure 8:
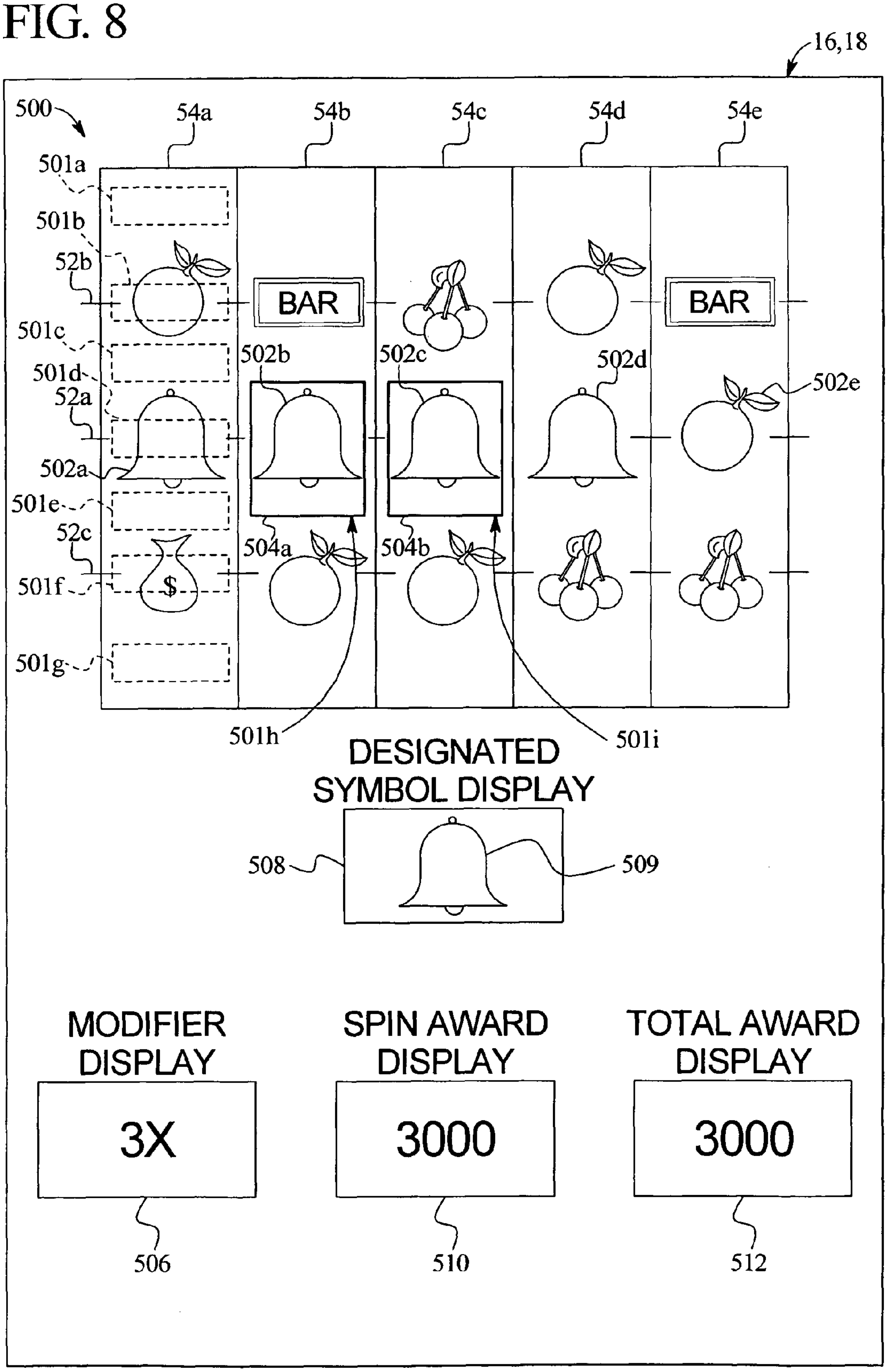
FIG. 8 is an enlarged elevation view of another alternative embodiment of the present invention where the gaming device enables the player to pick a plurality of the positions associated with a set of reels.

Referring now to FIG. 8, another alternative embodiment of the present invention is illustrated where the gaming device enables the player to pick a plurality of the positions associated with the reels in a play of the game. In this embodiment, the gaming device displays a plurality of reels 54*a*, 54*b*, 54*c*, 54*d* and 54*e* on symbol display 500 in a play of the game. The gaming device also includes or displays a plurality of positions 501*a*, 501*b*, 501*c*, 501*d*, 501*e*, 501*f*, 501*g*. A plurality of paylines 52*a*, 52*b* and 52*c* are associated with the reels. The reels include a plurality of symbols which are conventional reel game symbols illustrated in FIG. 8 to the player. The gaming device randomly determines or predetermines a symbol to be the designated symbol in the play of the game such as the bell symbol 509 indicated by the designated symbol display 508. The gaming device also randomly determines or predetermines a modifier to provide to the player in a play of the game. In this embodiment, the gaming device determines a modifier of 1× to be the base or initial modifier in the play of the game as indicated by the modifier display 506. The gaming device increments the modifier by a designated amount for any of the designated symbols that are displayed at the selected positions in that play of the game. The gaming device also includes a spin award display 510 and a total award display 512 which indicate the spin award and the total award provided to the player in one or more plays of the game.

In an example of this embodiment illustrated in FIG. 8, the gaming device enables the player to pick two positions of the plurality of selectable positions. The gaming device may provide a message or prompt a player to pick the designated number of the selectable positions by displaying a message to the player as described above, providing an audio message to the player, providing an audio-visual message to the player or any other suitable message, instruction or prompt. In the illustrated example, the player picks positions 501*h* and 501*i*. Two borders, boxes or indicators 504*a* and 504*b* indicate the picked positions. The gaming device randomly determines the bell symbol 509 to be the designated symbol as indicated by the designated symbol display 508. The gaming device or player activates the reels to display a plurality of symbols in the play of the game. As Illustrated in FIG. 8, payline 52*a* is the only payline that indicates a winning symbol combination in this play of the game. Payline 52*a* indicates four bell symbols 502*a*, 502*b*, 502*c* and 502*d*. Additionally, the designated symbol (i.e, the bell symbol) is displayed at each of the selected positions 501*h* and 501*i*.

Because both positions selected by the player indicate a bell symbol, which matches the designated symbol or target symbol 509 indicated by the designated symbol display 508, the gaming device increments the modifier or multiplier by two (i.e., one for each of the bell symbols appearing in the selected positions). Therefore, the base multiplier of 1× is incremented by two to 3× and provided to the player in that play of the game. Moreover, the symbol combination including four bell symbols provides an award of one thousand credits to the player as indicated by the table in FIG. 4B. Therefore, the award one thousand credits is multiplied by the multiplier of 3× to provide the player an award of three thousand credits as indicated by the spin award display 510. The spin award of three thousand is added to the players total award of zero to provide the player of a new total award of three thousand credits as indicated by the total award display 512. It should be appreciated that the gaming device may enable to the player to pick one, a plurality or all of the positions in a play of the game.

Figure 9:
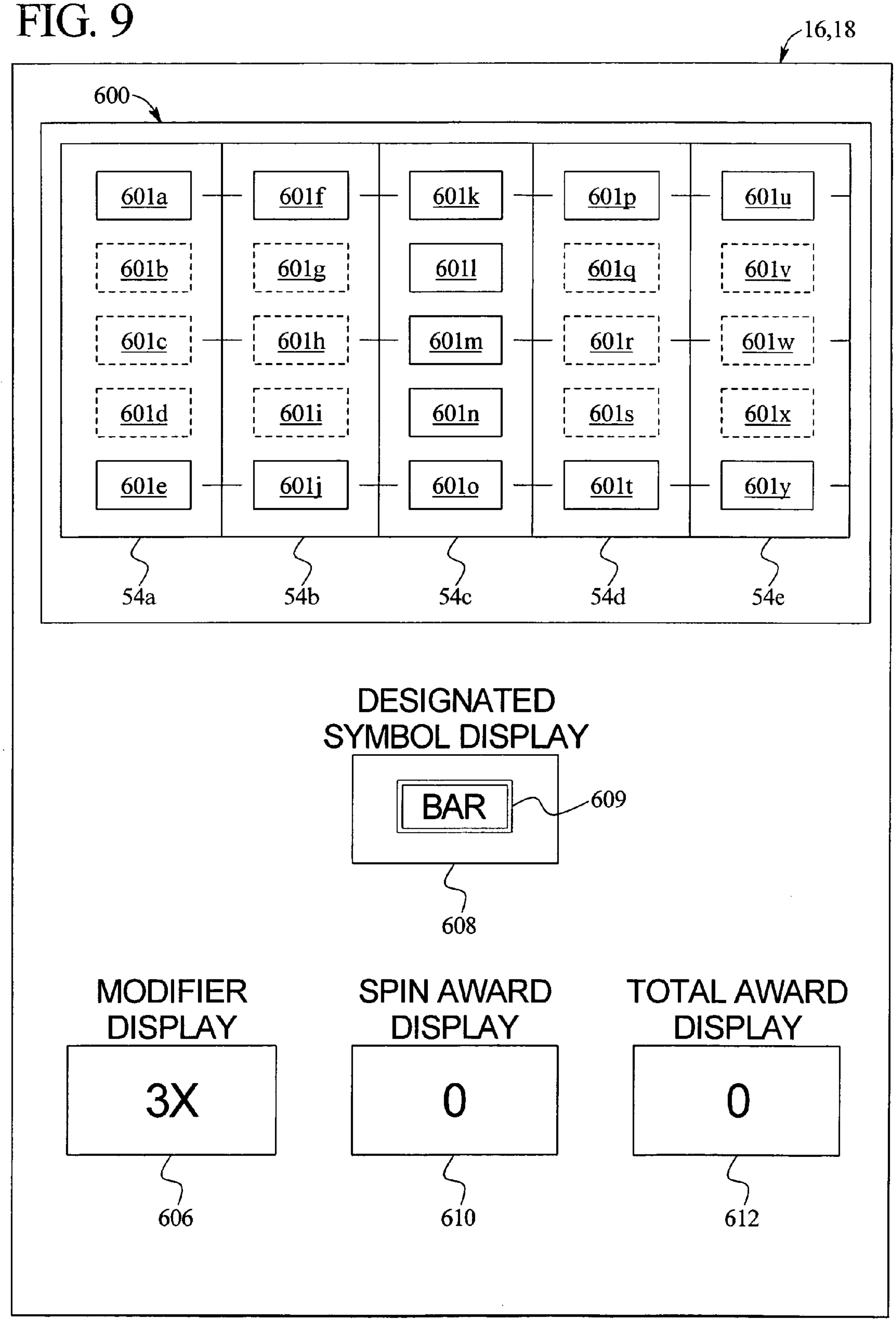
FIG. 9 is an enlarged elevation view of a further alternative embodiment of the present invention illustrating a set of reels including a plurality of positions where a designated number of the positions are selectable by a player.

Referring now to FIG. 9, another alternative embodiment of the present invention is illustrated where the gaming device enables a player to pick certain of the positions but not all of the positions. For example, the gaming device enables the player to pick one or more of the positions 601*a*, 601*e*, 601*f*, 601*j*, 601*k*, 601*l*, 601*m*, 601*n*, 601*o*, 601*p*, 601*t*, 601*u* and 601*y*. In this example, the gaming device does not enable the player to pick any of the other positions such as positions 601*b*, 601*c*, 601*d*, 601*g*, 601*h*, 601*i*, 601*q*, 601*r*, 601*s*, 601*v*, 601*w* and 601*x* in the game. It should be appreciated that the positions which are selectable by the player may be randomly determined, pre-determined, determined based on a wager made by the player or determined according to any suitable determination method. Additionally, the selectable positions may be positions which form any suitable shape, image or pattern such as the pattern illustrated in FIG. 9.

In another embodiment, the gaming device displays a plurality of reels and enables the player to pick at least one of the reels. The gaming device selects one of the symbols on the reels to be the designated symbol. The gaming device or player activates the reels to display symbols on the reels. If the designated symbol occurs on the reel picked by the player, the gaming device applies the award enhancement feature (i.e., the modifier) to any winning symbol combinations including the designated symbol occurring on the picked reel. Accordingly, the award associated with each winning symbol combination including the designated symbol are modified by the modifier. It should be appreciated that one, a plurality of all of the winning symbol combinations may be modified by the modifier.

Figure 10A:
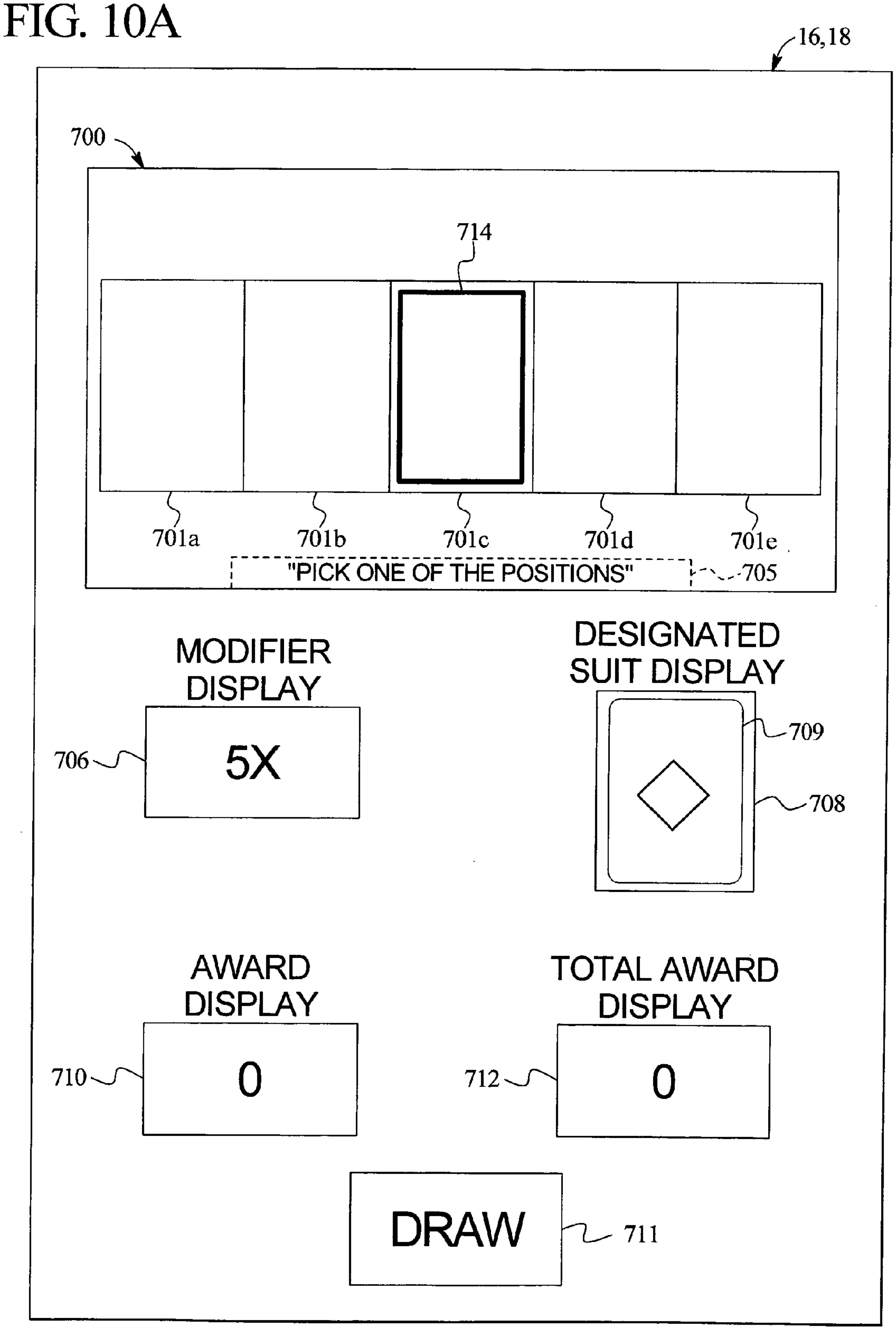
FIGS. 10A, 10B and 10C are enlarged elevation views of another alternative embodiment of the present invention illustrating an example of a draw poker game employing the award enhancement feature.
Figure 10B:
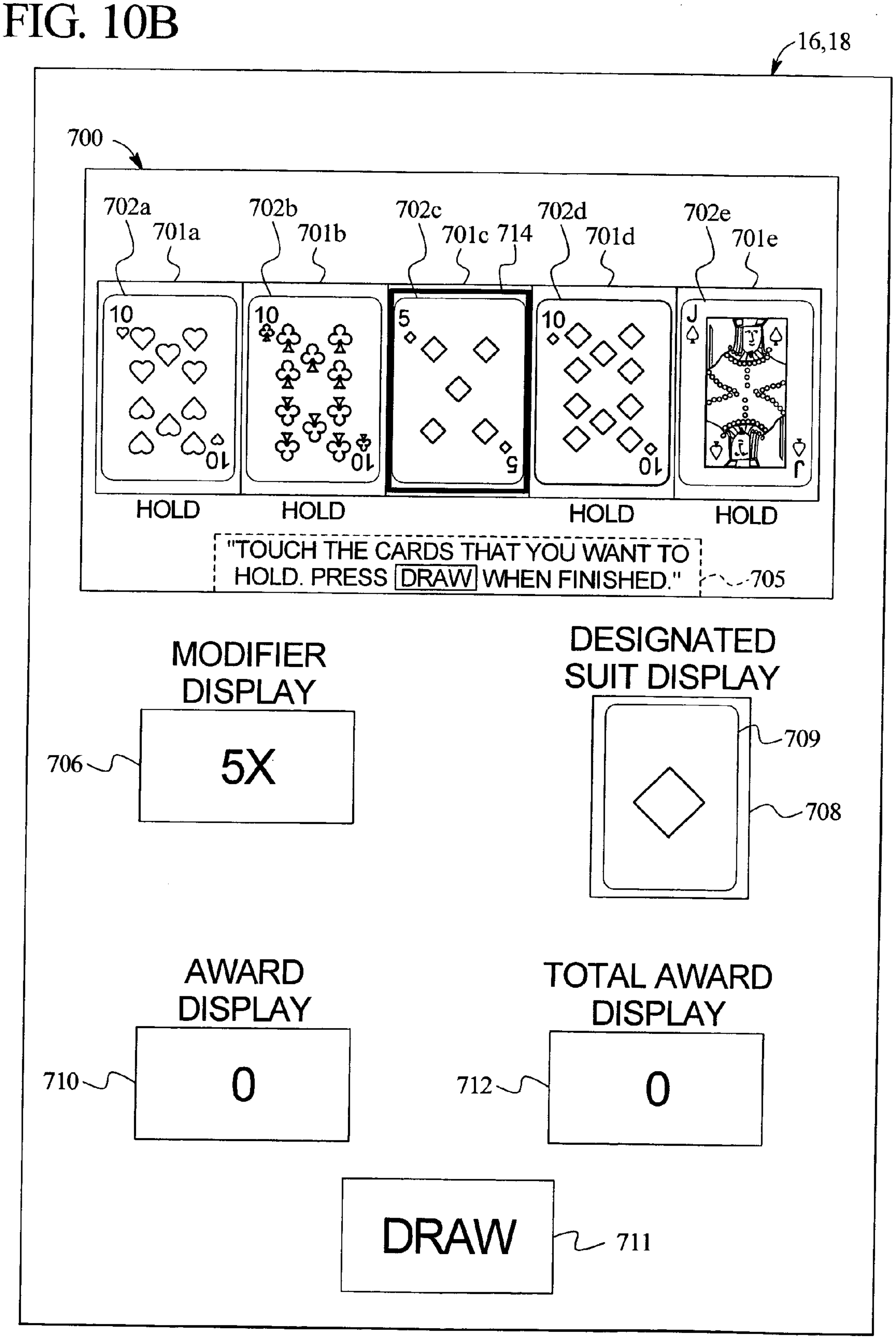
Figure 10C:
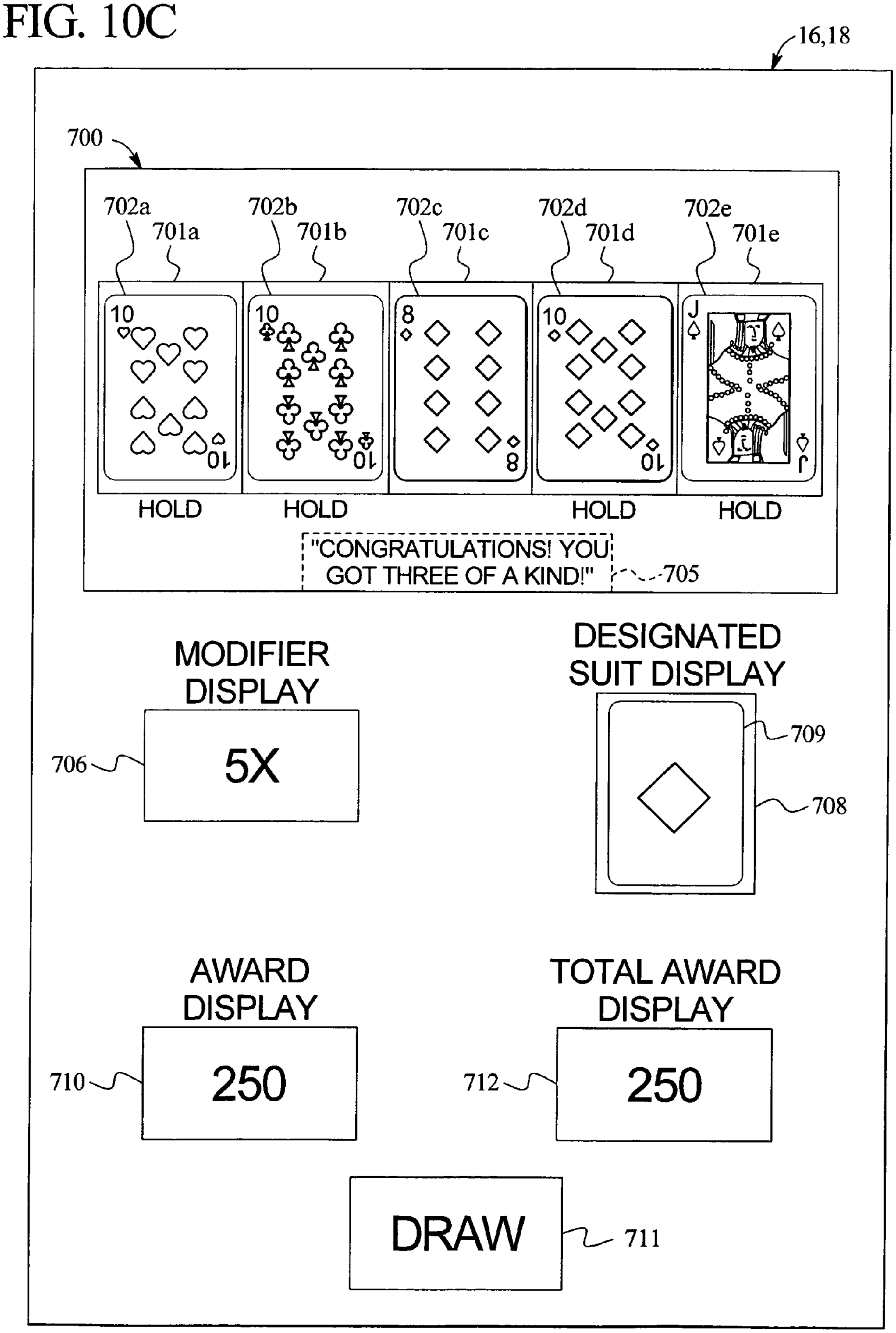

Referring now to FIGS. 10A to 10C, an example of another embodiment is illustrated where the gaming device includes a draw poker game. In the draw poker game, the gaming device displays a plurality of positions and specifically five positions 701*a*, 701*b*, 701*c*, 701*d* and 701*e* to the player. The gaming device also determines the modifier to be a multiplier of 5× as indicated by the modifier display 706 and the designated suit to be diamonds (labeled as 709) as indicated by the designated suit display 708. The gaming device prompts the player to pick one of the positions as indicated by the prompt or message 705 displayed to the player. It should be appreciated that any suitable message, indicator or prompt may be used to inform or instruct the player to perform some function in the game. In this example, the player has not obtained an award in this game as indicated by the award display 710. Also, the total award is zero as indicated by the total award display 712. As illustrated in FIG. 10A, the player picks or selects position 701*c* in the game. Indicator 714 indicates or highlights the position selected by the player.

Referring now to FIG. 10B, the gaming device displays playing cards 702*a*, 702*b*, 702*c*, 702*d* and 702*e* at positions 701*a*, 701*b*, 701*c*, 701*d* and 701*e*, respectively. Specifically, position 701*a* displays the ten of hearts (labeled as 702*a*), position 701*b* displays the ten of clubs (labeled as 702*b*), position 701*c* displays the five of diamonds (labeled as 702*c*), position 701*d* displays the ten of diamonds (labeled as 702*d*), and position 701*e* displays the jack of spades (labeled as 702*e*). The combination of playing cards displayed at the positions 701*a*, 701*b*, 701*c*, 701*d* and 701*e* indicate a winning hand of three of a kind (i.e., the ten of hearts, the ten of clubs, and the ten of diamonds). As illustrated in FIG. 4B, three of a kind provides an award of fifty. The player must now determine which of the cards the player wants to hold or maintain in the hand as indicated by the message 705 displayed to the player.

The player's decision is based on which hand or combination of cards will provide the largest award to the player in this play of the game. For example, three of a kind provides an award of fifty to the player. If the player decides to hold the cards that form this winning hand (i.e., cards 702*a*, 702*b* and 702*d*), the player at least keeps this winning hand in the play of the game. The player also has the opportunity to obtain a larger award if the player obtains a better winning card combination in the next draw of the cards. For example, if a card including the designated suit is displayed at position 701*c* (i.e., the non-held position) the award of fifty associated with the winning hand of three of a kind is modified by the multiplier of 5× to provide a modified award of two hundred fifty to the player. Alternatively, the player may obtain a full house if a jack is displayed at position 701*c*. A full house provides an award of two hundred fifty to the player. Therefore, the award enhancement feature provides excitement and enjoyment to players because the players have more opportunities to obtain awards and specifically, larger awards in a game.

In this example, the player touches or presses cards 702*a*, 702*b*, 702*d* and 702*e* to hold or maintain these cards in their hand. The player presses or touches the draw button 711 to cause the gaming device to replace the non-held cards (i.e., card 702*c*) in the game with a different card.

Referring now to FIG. 10C, the gaming device displays the eight of diamonds (card 702*c*) at position 701*c* after the draw of the cards. As indicated by the message 705, the player still has three tens or three of a kind in this play of the game. The suit of diamonds associated with the card 702*c* is the designated suit as indicated by the designated suit display 708. Therefore, the gaming device employs the award enhancement feature or modifier in this play of the game. The award associated with three of kind is fifty credits. The award of fifty credits is multiplied by the multiplier of 5× as indicated by the modifier display 706 to be an award of two hundred and fifty credits as indicated by the award display 710. The award of two hundred and fifty credits is provided to the player as indicated by the total award display. The award enhancement feature or modifier therefore enabled the player to obtain a much larger award in the game.

Figure 11A:
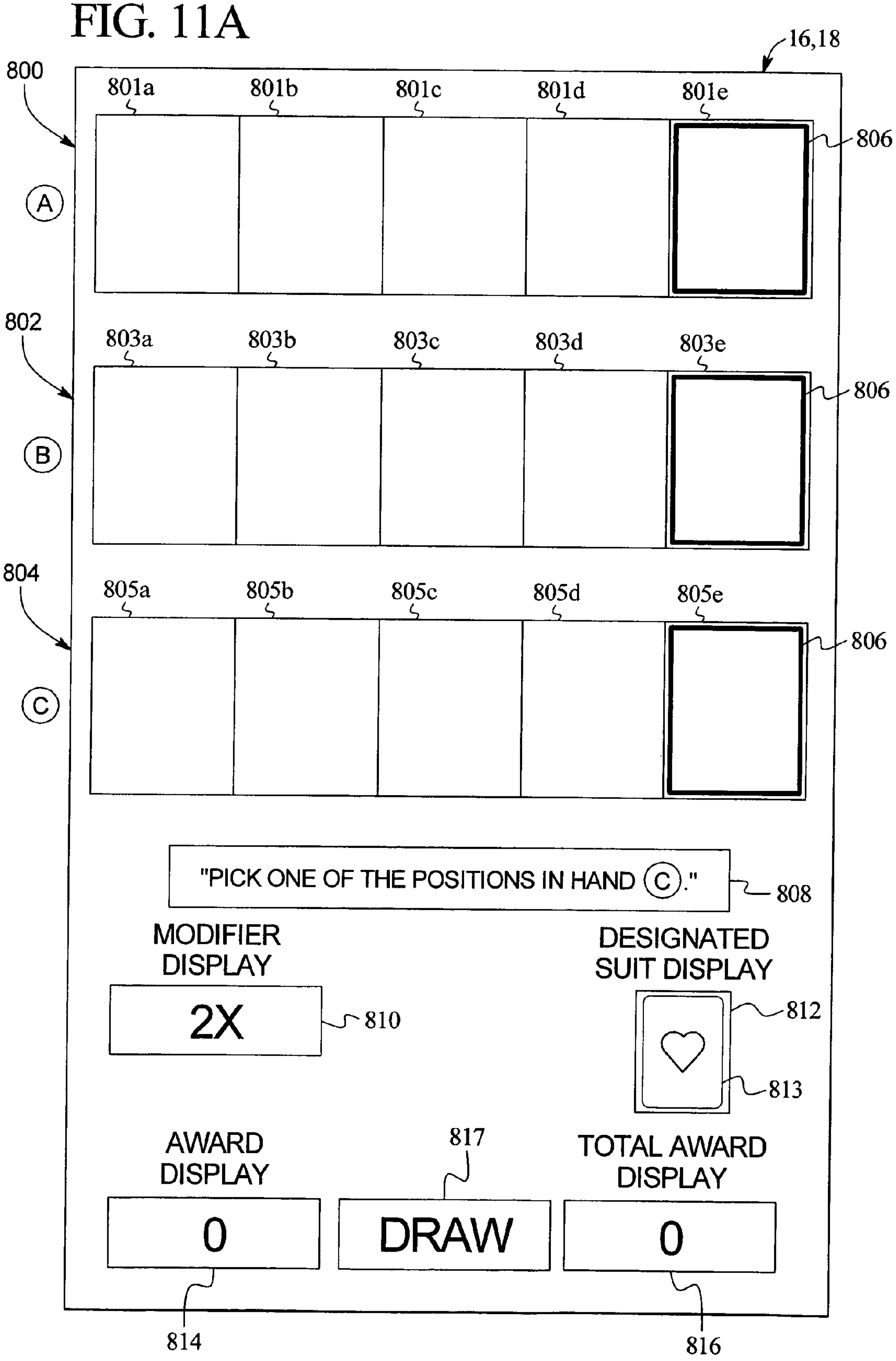
FIGS. 11A, 11B and 11C are enlarged elevation views of a further alternative embodiment of the present invention illustrating an example of a multi-hand draw poker game employing the award enhancement feature.
Figure 11B:
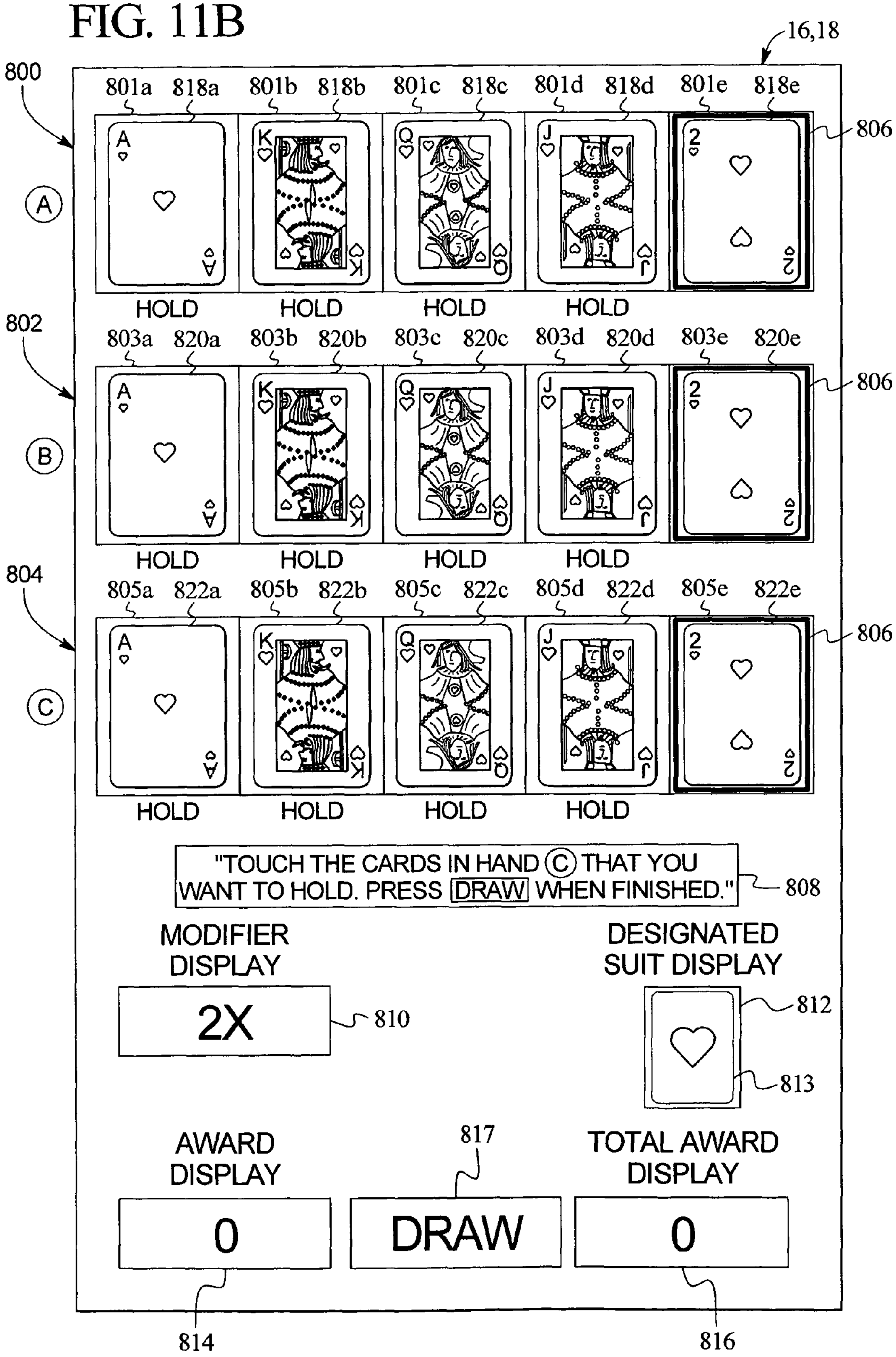
Figure 11C:
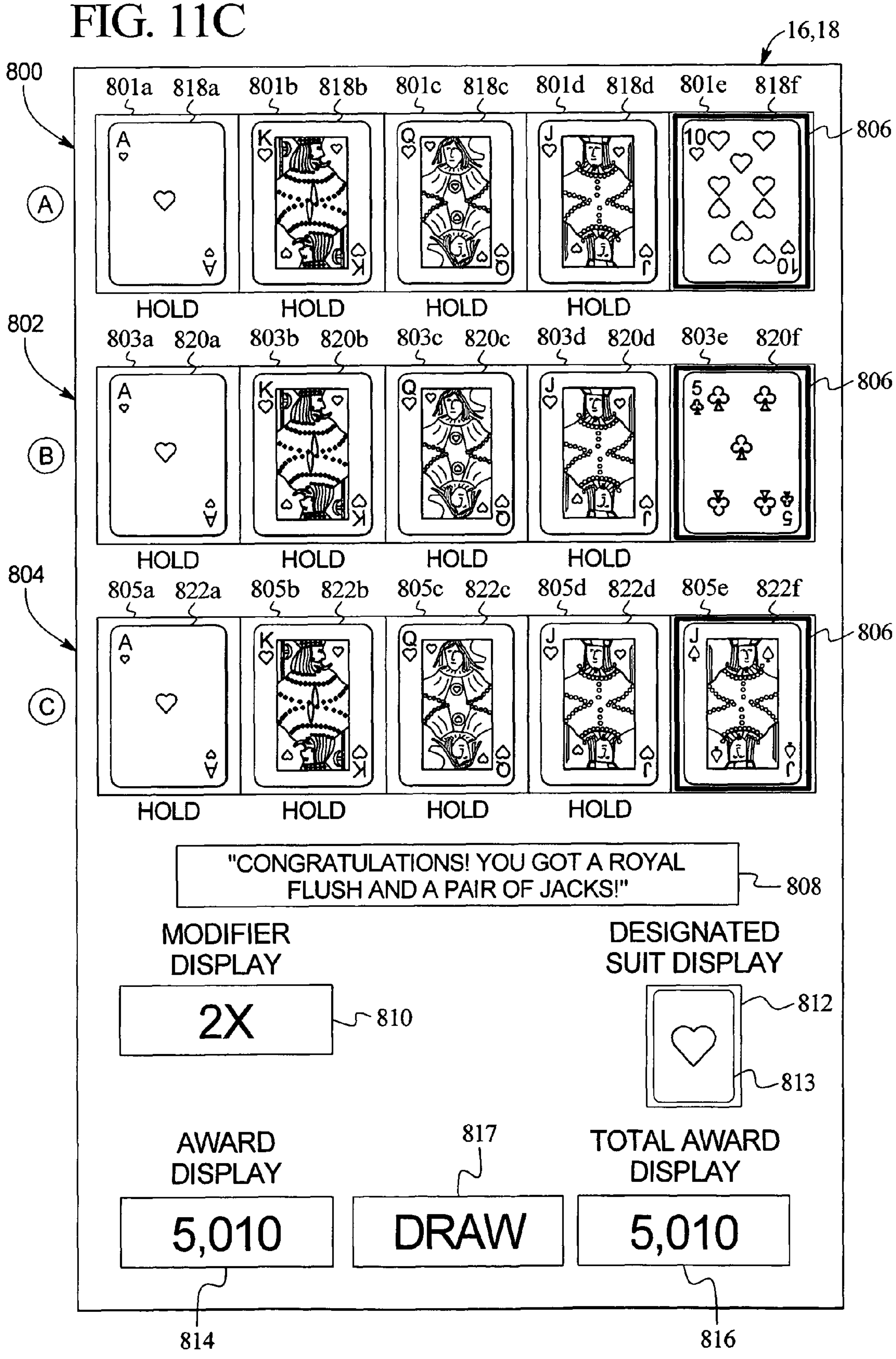

Referring now to FIGS. 11A to 11C, an example of a further embodiment of the present invention is illustrated where a multi-draw poker game is illustrated. In this example, the gaming device displays three combinations of cards or playing card hands 800 (hand A), 802 (hand B) and 804 (hand C). Playing card hand 800 includes five positions 801*a*, 801*b*, 801*c*, 801*d* and 801*e*. Playing card hand 802 includes five positions 803*a*, 803*b*, 803*c*, 803*d* and 803*e*. Similarly, playing card hand 804 includes five positions 805*a*, 805*b*, 805*c*, 805*d* and 805*e*. A prompt 808 displays a message or instruction to the player. A modifier display 810 indicates the modifier provided to the player. In this example, the gaming device determines a multiplier of 2× to be the modifier in the game. A designated suit display 812 indicates the suit determined to be the designated suit in the game by the processor. In this example, the suit of hearts (labeled as 813) is the designated suit. An award display 814 indicates the award obtained by the player in that play of the game. Additionally, a total award display 816 indicates the total award accumulated by the player in a game or games. A draw button 817 enables the player to obtain one or more draws of the playing cards in a game.

In this example, the gaming device prompts the player to pick one of the positions in playing card hand C or 804 as indicated by the prompt 808. In this example, the gaming device indicates the same position in each of the playing card hands that the player picks in playing card hand 804. It should be appreciated that the gaming device may enable the player to pick one or more of the positions in one, a plurality of or all of the playing card hands in a play of the game. In this example, the player picks position 805*e* in playing card hand 804. The gaming device indicates the picked or selected position using an indicator or border 806. The gaming device also uses the border or indicator 806 to indicate the same position in each of the other playing card hands. For example, position 803*e* and position 801*e* in playing card hands 802 and 800, respectively, are highlighted or indicated. The gaming device will now indicate or display a playing card at each of the positions in playing card hands 800, 802 and 804.

Referring now to FIG. 11B, the gaming device indicates an ace of hearts, a king of hearts, a queen of hearts, a jack of hearts and a two of hearts at positions 805*a*, 805*b*, 805*c*, 805*d* and 805*e*, respectively, in playing card hand 804. In this embodiment, the gaming device indicates the same cards in each of the other playing card hands 800 and 802. Therefore, an ace of hearts, king of hearts, queen of hearts, jack of hearts and two of hearts is indicated in positions 803*a*, 803*b*, 803*c*, 803*d* and 803*e*, respectively, in playing card hand 802. Similarly, an ace of hearts, king of hearts, queen of hearts, jack of hearts and two of hearts are indicated in positions 801*a*, 801*b*, 801*c*, 801*d* and 801*e* in playing card hand 800, respectively. It should be appreciated that the same or different playing cards may be indicated at one or more of the positions of playing card hands 800 and 802. In this example, the gaming device prompts the player to select the cards in playing card hand C that the player wants to hold in the hand as indicated by prompt 808. The prompt indicates that the player should press the draw button when finished.

In this example, playing card hand C or hand 804 indicates a flush (i.e., playing cards including the same suit of hearts). Accordingly, a flush is also indicated by hands 800 and 802. Furthermore, the selected position 805*e* and positions 801*e* and 803*e* each indicate the designated suit of hearts. Thus, each hand provides an award of one hundred fifty multiplied by the multiplier of 2× indicated by the modifier display 810 or three hundred. The total award associated with the three hands 800, 802 and 804 is therefore nine hundred.

However, each hand only needs one card in positions 801*e*, 803*e* and 805*e*, the ten of hearts, to become a royal flush instead of a flush. A royal flush provides an award of two thousand five hundred. Additionally, hearts is the designated suit and therefore the royal flush award would also be multiplied by 2×. Therefore, the player must determine if they want to keep the guaranteed award of nine hundred associated with the present hands or try to obtain the larger award associated with the royal flush.

In this example, the player decides to hold cards 822*a*, 822*b*, 822*c* and 822*d* at positions 805*a*, 805*b*, 805*c* and 805*d* in playing card hand C or 804. The player therefore is trying to obtain the royal flush in at least one of the hands in this play of the game. In this example, holding cards 822*a*, 822*b*, 822*c* and 822*d* also holds the cards in the same positions in the other two hands. Therefore, playing cards 820*a*, 820*b*, 820*c* and 820*d* in playing card hand 802 and playing cards 818*a*, 818*b*, 818*c* and 818*d* in playing card hand 800 are also held in this play of the game. After the player has determined which cards to hold, the player presses the draw button 817 to cause the gaming device to select and display different cards in the non-held positions 801*e*, 803*e* and 805*e* in playing card hands 800, 802 and 804, respectively.

Referring to FIG. 11C, after the player presses the draw button 817, the gaming device displays a ten of hearts (labeled as 818*f*) at position 801*e*, a five of clubs (labeled as 820*f*) at position 803*e* and a jack of spades (labeled as 822*f*) at position 805*e*. Therefore, the player obtained a royal flush in playing card hand 800 as indicated by the ace of hearts, king of hearts, queen of hearts, jack of hearts and ten of hearts at positions 801*a*, 801*b*, 801*c*, 801*d* and 801*e*, respectively. The player did not obtain an award for the cards indicated in playing card hand 802 because the combination of cards in that hand did not indicate a winning hand. The cards indicated in playing card hand 804 indicate a pair of jacks 822*d* and 822*f* at positions 805*d* and 805*e*, respectively. A pair of jacks is also a winning hand as illustrated in FIG. 4B. Additionally, the designated suit of hearts 813 is indicated at the selected position 801*e*. Accordingly, the gaming device applies the modifier of 2× indicated by the modifier display 810 to the award associated with the royal flush indicated in playing card hand 800. The award of two thousand five hundred associated with the royal flush, as illustrated by FIG. 4B, is multiplied by the multiplier 2×, to provide an award of five thousand. Additionally, the award of ten associated with the pair of jacks indicated by playing card hand 804 is provided to the player. The player's award in this play of the game is five thousand plus ten or five thousand ten as indicated by the award display 814. This award is added to the player's total award of zero to provide the player with a total award of five thousand ten as indicated by the total award display 816.

This example further illustrates how the award enhancement feature enhances a player's award in the game to provide players with larger awards in a play of the game and thereby more excitement and enjoyment of the game.

In another embodiment, the gaming device includes a plurality of game elements each having a color where at least two of the colors are different. In this embodiment, the gaming device designates a color as the designated element in the game. If the designated color appears or occurs at a position or positions selected by a player, the gaming device provides the award enhancement feature to the player in that play of the game. It should be appreciated that the game elements may include any suitable color or colors.

In a further embodiment, the gaming device enables a player to place an optional side bet, extra bet or additional wager in one or more plays of a game to purchase the opportunity to obtain the award enhancement feature in one or more plays of the game. For example, the gaming device enables a player to wager twenty credits to have the opportunity to obtain the award enhancement features in the game. If the player wagers the twenty additional credits in the game, the gaming device enables the player to pick one or more positions displayed in the game to attempt to obtain the designated element at those positions in the game. It should be appreciated that the side bet or additional bet may be any suitable bet amount or wager amount.

It should be appreciated that any suitable number of the selectable positions may be employed in a game such as a primary game, a secondary or bonus game, a sub-game or any other suitable game.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of a game, to:

(a) enable a player to place a wager on a play of the game, (b) thereafter, enable the player to select at least one of a plurality of positions, (c) cause the at least one display device to display one of a plurality of symbols at each of the positions to form a combination of said symbols, each of said symbols including at least one game element, (d) randomly determine at least one of the game elements to be a designated element, wherein the determination is independent of the player selections, (e) cause the at least one display device to display the designated element, (f) after the formed combination of said symbols is displayed, evaluate the formed combination of said symbols displayed at the positions to determine if the formed combination of said symbols is one of a plurality of winning combinations of said symbols, (g) determine any award associated with any formed winning combination of the symbols displayed at the positions, (h) determine if the designated element is displayed at the selected position, (i) if the designated element is displayed at the selected position:

(i) determine a value of a modifier, wherein the value of the modifier is determined separate from the determination that the designated element is displayed at the selected position, (ii) modify any determined awards by the determined modifier, and (iii) provide any modified awards to the player, and (j) if the designated element is not displayed at the selected position, provide any determined awards to the player.

2. The gaming device of claim 1, wherein the plurality of instructions, when executed by the at least one processor, cause the at least one processor to randomly determine a plurality of the game elements to each be one of a plurality of designated elements.

3. The gaming device of claim 1, wherein the game is a poker game, and wherein the symbols are a plurality of playing cards, each of the playing cards including a plurality of game elements, said game elements including a suit, a value and a color.

4. The gaming device of claim 3, wherein the plurality of instructions, when executed by the at least one processor, cause the at least one processor to determine at least one of the suits, the values and the colors associated with the playing cards to be the designated element in the poker game.

5. The gaming device of claim 1, wherein the game is a reel game having a plurality of reels, each of the reels displaying a plurality of the symbols, each of the symbols including a value.

6. A gaming device, said gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of a game, to:

(a) enable a player to place a wager on a play of the game, (b) thereafter, enable the player to select a plurality of positions, wherein which positions are selected are independent of the placed wager, (c) cause the at least one display device to display one of a plurality of symbols at each of the positions to form a combination of said symbols, each of said symbols including at least one game element, (d) randomly determine at least one of the game elements to be a designated element, wherein the determination is independent of the player selections, (e) cause the at least one display device to display the designated element, (f) after the formed combination of said symbols is displayed, evaluate the formed combination of said symbols displayed at the positions to determine if the formed combination of said symbols is one of a plurality of winning combinations of said symbols, (g) determine any award associated with any formed winning combination of the symbols displayed at the positions, (h) determine if any of the selected positions display the designated element, (i) if any of the selected positions display the designated element:

(i) determine a modifier based on the number of the selected positions which display the designated element, (ii) modify any determined awards by the determined modifier, and (iii) provide any modified awards to the player, and (j) if none of the selected positions display the designated element, provide any determined awards to the player.

7. The gaming device of claim 6, wherein the game is a poker game and wherein the symbols are a plurality of playing cards, each of the playing cards having a plurality of game elements, said game elements including a suit, a value and a color.

8. The gaming device of claim 7, wherein the plurality of instructions, when executed by the at least one processor, cause the at least one processor to determine at least one of the suits, the values and the colors associated with the playing cards to be the designated element in the poker game.

9. The gaming device of claim 6, wherein the modifier is incremented by a designated amount for each designated element displayed at a selected position.

10. The gaming device of claim 9, wherein the designated amount is determined based on at least one of: a random determination by the processor, a pre-determination by the processor and a determination based on the wager made by the player.

11. The gaming device of claim 6, which includes at least one value associated with each of the symbols, wherein the value of the modifier includes the sum of the values of the symbols displayed at the selected positions if the symbols displayed at the selected positions include a game element determined to be the designated element.

12. The gaming device of claim 6, which includes at least one value associated with each of the symbols, wherein the value of the modifier includes the product of the values of the symbols displayed at the selected positions if the symbols displayed at the selected positions include a game element determined to be the designated element.

13. The gaming device of claim 6, wherein the game is a reel game including a plurality of reels, each of the reels having a plurality of the symbols, each of the symbols including a value.

14. The gaming device of claim 13, wherein the value of the modifier is the same as the value of the symbol displayed at the selected position when the symbol displayed at the selected position includes a game element determined to be the designated element.

15. A method for operating a gaming device, for each play of a game, said method comprising:

(a) enabling a player to place a wager on a play of the game;

(b) causing a display device to display a plurality of positions in the game;

(c) causing the display device to display a modifier to the player;

(d) randomly determining at least one game element selected from a plurality of game elements to be a designated element;

(e) causing the display device to display the designated element to the player;

(f) after the player places the wager, enabling the player to select at least one of the positions, wherein the at least one selection is independent of the determination of the designated game element;

(g) causing the display device to display one symbol at each of the positions to form a combination of said symbols, each of said symbols including at least one of the game elements;

(h) after the formed combination of said symbols is displayed, evaluating the formed combination of said symbols displayed at the positions to determine if the formed combination of said symbols is one of any winning combinations of said symbols;

(i) determining an award associated with any formed winning combination of the symbols displayed at the positions;

(j) determining if the selected position displays the designated element;

(k) if the selected position displays the designated element:

(i) determining a value of a modifier, wherein the value of the modifier is determined separate from the determination that the designated element is displayed at the selected position, (ii) modifying any determined awards by the determined modifier, and (iii) providing any modified awards to the player, and (l) if the selected position does not display the designated element, providing any determined awards to the player.

16. The method of claim 15, wherein displaying a plurality of positions in the game includes displaying a plurality of positions in a poker game, and wherein the symbols are a plurality of playing cards, each of the playing cards including at least one of the game elements, said game elements including a suit, a value and a color.

17. The method of claim 16, which includes determining at least one of the suits, the values and the colors associated with the playing cards to be the designated element in the poker game.

18. The method of claim 15, wherein displaying a plurality of positions in the game includes displaying a plurality of positions in a reel game including a plurality of reels, each of the reels having a plurality of the symbols, each of the symbols including a value.

19. The method of claim 15, which includes randomly determining a plurality of the game elements to each be one of a plurality of designated elements.

20. The method of claim 15, which includes operating the gaming device through a data network.

21. The method of claim 20, wherein the data network is an internet.

22. A method for operating a gaming device, for each play of a game, said method comprising:

(a) enabling a player to place a wager on a play of the game;

(b) causing a display device to display a plurality of positions to the player in the game;

(c) causing the display device to display a modifier to the player;

(d) randomly determining at least one game element selected from a plurality of game elements to be a designated element;

(e) after the player places the wager, enabling the player to select a plurality of the positions, wherein the selections are independent of the determination of the designated game element and which positions are selected are independent of the placed wager;

(f) causing the display device to display one of the symbols at each of the positions to form a combination of said symbols;

(g) after the formed combination of said symbols is displayed, evaluating the formed combination of said symbols displayed at the positions to determine if the formed combination of said symbols is one of any winning combinations of said symbols;

(h) determining any award associated with any formed winning combination of the symbols displayed at the positions;

(i) determining if any of the selected positions display the designated element;

(j) if any of the selected positions display the designated element:

(i) determining the modifier based on the number of the selected positions which display the designated element;

(ii) modifying any determined awards by the determined modifier; and (iii) providing any modified awards to the player; and (k) if none of the selected positions display the designated element, providing any determined awards to the player.

23. The method of claim 22, which includes associating values with the symbols, wherein the value of the modifier includes the sum of the values associated with any symbols displayed at the selected positions if the symbols displayed at the selected positions include a game element determined to be the designated element.

24. The method of claim 22, which includes associating values with the symbols, wherein the value of the modifier includes the product of the values associated with any symbols displayed at the selected positions if the symbols displayed at the selected positions include a game element determined to be the designated element.

25. The method of claim 22, which includes incrementing the modifier by a designated amount for each designated element displayed at the selected positions.

26. The method of claim 25, wherein incrementing the modifier by a designated amount includes at least one of: incrementing the modifier by a randomly determined amount, incrementing the modifier by a pre-determined amount and incrementing the modifier by an amount based on the wager made by the player.

27. The method of claim 22, wherein the game is a poker game, and wherein the symbols are playing cards, each of the playing cards including at least one of the game elements, said game elements including a suit, a value and a color.

28. The method of claim 27, which includes determining at least one of the suits, the values and the colors to be the designated element in the poker game.

29. The method of claim 22, which includes randomly determining a plurality of the game elements to each be one of a plurality of designated elements in the game.

30. The method of claim 22, wherein the game is a reel game including a plurality of reels, each of the reels including a plurality of the symbols, each of the symbols including a value.

31. The method of claim 30, wherein the processor determines one of the symbols to be the designated element, and wherein the value of the modifier is the same as the value of the symbol displayed at the selected position if the symbol displayed at the selected position is determined to be the designated element.

32. The method of claim 22, which includes operating the gaming device through a data network.

33. The method of claim 32, wherein the data network is an internet.

* * * * *